United States Patent
Chen

(10) Patent No.: US 11,620,452 B2
(45) Date of Patent: Apr. 4, 2023

(54) DYNAMIC TEXT MESSAGE PROCESSING IMPLEMENTING ENDPOINT COMMUNICATION CHANNEL SELECTION

(71) Applicant: LIVEPERSON, INC., New York, NY (US)

(72) Inventor: Anthony Chen, Austin, TX (US)

(73) Assignee: LIVEPERSON, INC., New York, NY (US)

(*) Notice: Subject to any disclaimer, the term of this patent is extended or adjusted under 35 U.S.C. 154(b) by 170 days.

(21) Appl. No.: 16/795,453

(22) Filed: Feb. 19, 2020

(65) Prior Publication Data

US 2020/0272790 A1   Aug. 27, 2020

Related U.S. Application Data

(60) Provisional application No. 62/809,136, filed on Feb. 22, 2019.

(51) Int. Cl.
```
G06F 40/30      (2020.01)
H04L 51/02      (2022.01)
H04L 51/216     (2022.01)
G06F 16/2452    (2019.01)
G06F 40/279     (2020.01)
G06N 20/00      (2019.01)
```

(52) U.S. Cl.
CPC ........ *G06F 40/30* (2020.01); *G06F 16/24522* (2019.01); *G06F 40/279* (2020.01); *G06N 20/00* (2019.01)

(58) Field of Classification Search
CPC .... G06F 40/205; G06F 40/279; G06F 40/284; G06F 40/30; G06F 40/35; H04L 51/02; H04L 51/14; H04L 51/04; H04L 51/216

USPC ............... 704/1, 9; 705/26.41, 27.1
See application file for complete search history.

(56) References Cited

U.S. PATENT DOCUMENTS

| | | | | |
|---|---|---|---|---|
| 10,681,212 B2* | 6/2020 | Sanghavi | ............ | H04M 3/5166 |
| 10,747,419 B2* | 8/2020 | Yao | ............ | G06F 40/47 |
| 11,314,944 B2* | 4/2022 | Lewis | ............ | G06F 40/20 |
| 11,489,739 B2* | 11/2022 | Higgins | ............ | H04L 51/02 |
| 11,489,741 B2* | 11/2022 | Clarke | ............ | H04L 41/16 |
| 2008/0189367 A1* | 8/2008 | Okumura | ............ | H04L 51/02 709/204 |
| 2009/0138563 A1* | 5/2009 | Zhu | ............ | H04W 4/14 709/206 |
| 2010/0261448 A1* | 10/2010 | Peters | ............ | H04W 4/90 455/466 |
| 2012/0147779 A1* | 6/2012 | Burckart | ............ | H04L 47/10 370/252 |
| 2014/0324854 A1* | 10/2014 | Isaacs | ............ | H04L 51/42 707/732 |

(Continued)

OTHER PUBLICATIONS

International Search Report and Written Opinion for PCT Application No. PCT/US2020/018893 dated May 25, 2020, 12 pages.

*Primary Examiner* — Martin Lerner
(74) *Attorney, Agent, or Firm* — Polsinelli LLP

(57) ABSTRACT

The present disclosure relates generally to providing a concierge service to handle a wide variety of topics and user intents via a text messaging interface. The concierge service can be part of a connection management system that can dynamically manage and facilitate natural language conversations between a user making a request or providing an instruction and one or more endpoints for the purposes of fulfilling the request or instruction.

21 Claims, 15 Drawing Sheets

(56) References Cited

U.S. PATENT DOCUMENTS

| | | | |
|---|---|---|---|
| 2015/0149177 A1* | 5/2015 | Kalns | G10L 15/1822 |
| | | | 704/257 |
| 2015/0149560 A1* | 5/2015 | Lee | H04L 51/066 |
| | | | 709/206 |
| 2016/0360466 A1* | 12/2016 | Barak | G06Q 30/02 |
| 2017/0147687 A1* | 5/2017 | Perun | G06F 40/30 |
| 2017/0242899 A1* | 8/2017 | Jolley | G06F 16/248 |
| 2017/0249309 A1* | 8/2017 | Sarikaya | G06F 40/35 |
| 2017/0250935 A1* | 8/2017 | Rosenberg | H04L 51/02 |
| 2017/0295114 A1 | 10/2017 | Goldberg et al. | |
| 2017/0300831 A1 | 10/2017 | Gelfenbeyn et al. | |
| 2018/0096686 A1 | 4/2018 | Borsutsky et al. | |
| 2018/0131643 A1* | 5/2018 | Trufinescu | G06F 16/24522 |
| 2018/0300399 A1 | 10/2018 | Blandin et al. | |
| 2018/0322403 A1 | 11/2018 | Ron et al. | |
| 2019/0068527 A1* | 2/2019 | Chen | G06F 40/35 |
| 2019/0149489 A1* | 5/2019 | Akbulut | G06N 20/00 |
| | | | 709/206 |
| 2019/0197111 A1* | 6/2019 | Garrote | G06F 40/30 |
| 2019/0207877 A1* | 7/2019 | Chung | H04L 51/02 |
| 2019/0311036 A1* | 10/2019 | Shanmugam | G06F 40/30 |
| 2019/0327193 A1* | 10/2019 | Kuncheria | G06Q 10/02 |
| 2020/0120185 A1* | 4/2020 | Salter | G06F 40/35 |
| 2021/0044547 A1* | 2/2021 | Bradley | H04L 51/02 |

* cited by examiner

DYNAMIC TEXT MESSAGE PROCESSING IMPLEMENTING ENDPOINT COMMUNICATION CHANNEL SELECTION

CROSS-REFERENCE TO RELATED APPLICATIONS

This application claims the benefit of U.S. Provisional Patent Application No. 62/809,136, filed Feb. 22, 2019, which is hereby incorporated by reference in its entirety.

FIELD

The present disclosure relates generally to communication processing using artificial intelligence (AI). More specifically, techniques are provided to deploy an AI platform to select endpoints in a communication channel, which allows users to engage with endpoints best suited to answer natural language queries.

BACKGROUND

Bot scripts can be executed to automate data processing and task management. However, as the amount of data grows in scale and becomes increasingly dynamic and complex, traditional bot scripts exhibit a significant lack of efficiency. Configuring bot scripts to correctly detect target outcomes for task management is often challenging. Bot scripts are also typically incapable of processing tasks across multiple different environments, such as between different communication channels.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure provide technical solutions to address the technical challenges presented above. For example, a bot (e.g., a bot script executing using a processor) may be configured to route data packets (e.g., communications, messages including content, signals, and the like) between network devices, client devices, and terminal devices. Bots may be configured to be coding language agnostic. For example, bots may be coded to use Application Programming Interfaces (APIs) to interact with systems, and therefore, may be coded in any language which is capable of making API calls. Certain embodiments of the present disclosure provide artificial intelligence techniques and/or machine learning techniques that can be implemented to enhance the bot's accuracy of routing instances based on machine-learning models.

Certain embodiments relate to systems and methods for dynamically processing messages between network devices (e.g., user devices operated by users), client devices, and terminal devices (e.g., operated by live agents) during communication sessions. In some implementations, bots can be configured to autonomously communicate with network devices. Further, bots can be configured for a specific capability. Non-limiting examples of capabilities can include intelligently routing communications to target destinations, modifying data stored in databases, providing updates to users, providing additional information about the user to agents, determining a user's intent and routing the user to a destination system based on the intent, predicting or suggesting responses to agents communicating with users, and escalating communication sessions between bots and one or more terminal devices. In some implementations, while a bot is communicating with a network device in a communication session (e.g., a Short Message Service (SMS), in-app chat feature of a native application, or web-based chat session), a communication server can automatically and dynamically determine to transfer the chat session to a terminal device associated with an agent. For example, bots can communicate with network devices about certain tasks (e.g., tasks, such as receiving updated information and updating a record stored in a database), whereas, terminal devices can communicate with network devices regarding more difficult tasks (e.g., solving a technical issue). In a single communication session in which the bot may be communicating with a user, a communication server can dynamically switch between the bot and a terminal device, so that the terminal device can communicate with the network device in lieu of or in addition to the bot. Advantageously, the communication session can dynamically switch between the bot and the terminal device to improve the balance of tasks associated with the terminal device.

In some implementations, bots can be configured to automatically and autonomously process tasks in and/or across multiple environments. As a non-limiting example, a communication server may be configured to establish or facilitate the establishment of an SMS text-based communication channel between a mobile device operated by a user (e.g., the network device) and a desktop computer operated by an agent (e.g., the terminal device). The communication server can transform input received from the desktop computer (e.g., key strokes) to SMS text messages and transmit the SMS text message to the user's mobile phone. During the communication session, a bot may assist the agent in communicating with the user, or the bot may take control of the conversation and communicate directly with the user using the communication channel.

Certain embodiments of the present disclosure include a computer-implemented method. The method may include receiving a request text message. The request text message may include a natural language request. The method may further include interpreting the natural language request to identify a pre-defined intent. The method may further include automatically selecting an endpoint to receive the natural language request based on the pre-defined intent. The method may further include forwarding the natural language request to the endpoint. The method may further include receiving a response to the natural language request from the endpoint. The method may further include generating a response text message based on the response. The response text message may include a natural language response. The method may further include transmitting the response text message.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

Advantageously, the increasingly dynamic nature of data ingested into and processed by systems (e.g., routing systems, the communication server described herein, and other suitable systems) introduces complexity into network environments. Executing bot scripts to autonomously and automatically process tasks involving the complex ingested data can cause undue burden on processing resources in the systems (e.g., incorrect routing of messages may cause servers or queues to be overloaded). Embodiments of the present disclosure provide technical advantages, including the implementation of artificial intelligence or machine-learning techniques, to improve the overall functioning of systems by reducing load imbalance across servers or systems, and continuously enhancing task management by bots.

BRIEF DESCRIPTION OF THE DRAWINGS

The present disclosure is described in conjunction with the appended figures.

Figure 1:
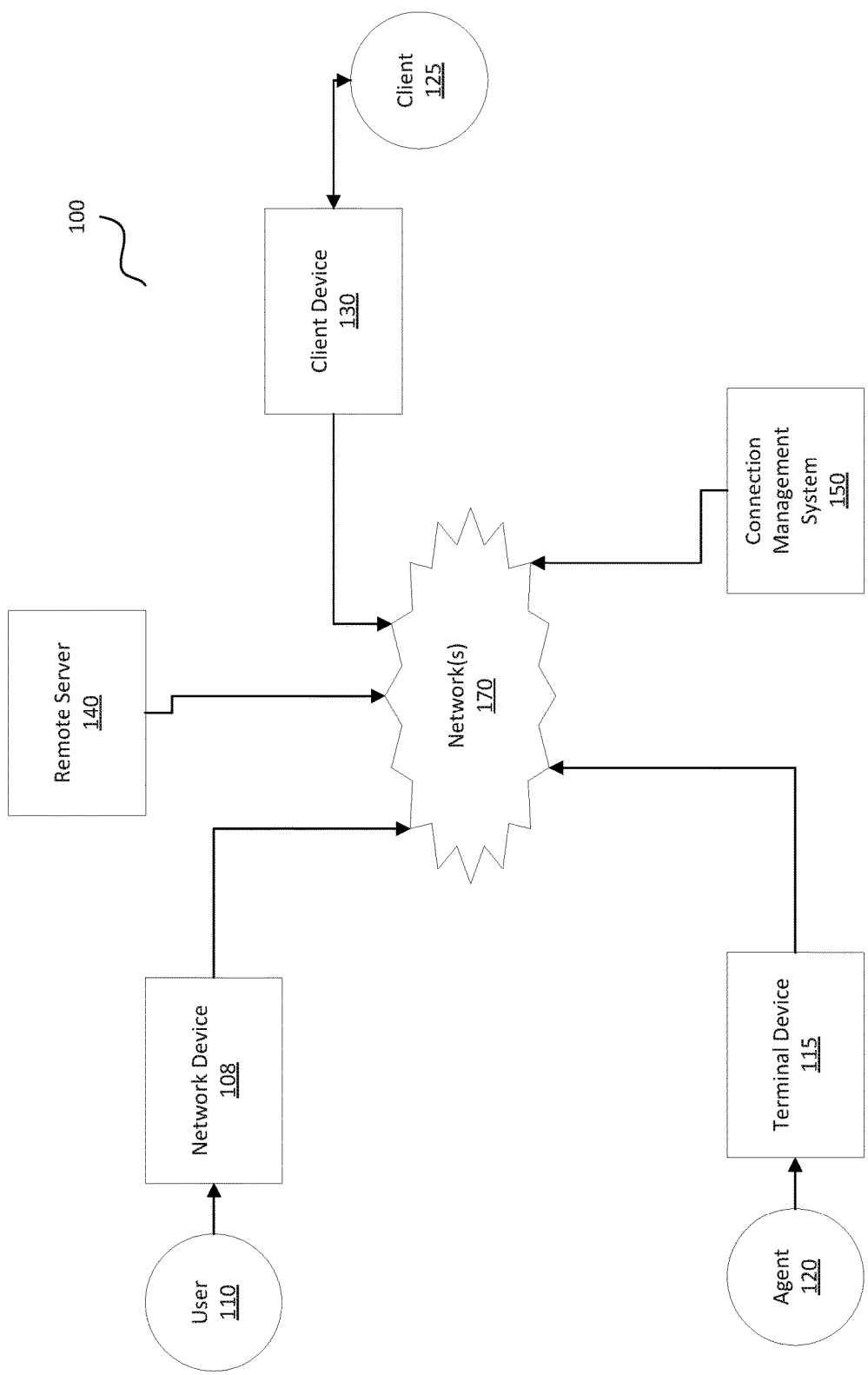
FIG. 1 shows a block diagram of an embodiment of a network interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing preferred examples of embodiment. It is understood that various changes can be made in the function and arrangement of elements without departing from the spirit and scope as set forth in the appended claims.

Embodiments pertain to a concierge artificial intelligence service for assisting users with tasks. The term "concierge" service is used to distinguish from prior art virtual assistants that can only perform a limited number of simple tasks, and that require a rigid protocol to communicate with. The concierge service described herein can receive a task by communications through a communication user interface on a network device, including, for example, a text message or other messaging application. The communications can be received in natural language (i.e., that does not require conformance to a rigid protocol including wake words, key words, specific phrases, explicitly naming services, etc.).

The concierge service can determine an intent of the received natural language communication and determine an appropriate endpoint to help the user with the task, and can open a conversation between the network device and the appropriate endpoint. An endpoint can be a terminal device of an agent, a client device of a client, an application programming interface (API) of a service, and the like. In some embodiments, the concierge service can be contacted by addressing the natural language communications to a public address, such as a phone number.

In some embodiments, the concierge service can receive communications that originate from a text messaging application. Text messaging applications can be characterized by some undesirable qualities, e.g., you cannot add or remove addresses from a conversation, conversation threads are strictly linear and therefore multiple topic threads are difficult to differentiate, etc. The concierge service can overcome this quality by acting as a mediator between a user operating an associated network device and one or more endpoints to be added to a conversation or removed. Additionally, when the concierge service detects an additional or new intent in the text message chain, the concierge service can delineate the conversations and present messages in a way that is clear to the user. Furthermore, when different endpoints are associated with different conversations, the concierge service can route only messages intended for endpoints in the respective conversation to the intended endpoints.

Embodiments can process requests given in natural language, which does not require conformance to rigid protocol. Embodiments can perform natural language processing techniques to understand a user's intent, and can select an available endpoint that matches the appropriate intent. Accordingly, embodiments do not require the user to be trained to gain benefits from the concierge service, nor does the concierge service require a specific application to be downloaded outside of a text messaging application.

Embodiments have been designed with several technological efficiencies. In one example, the present technology utilizes standard messaging applications to interface with a "concierge" artificial intelligence service. This provides efficiencies in that no new software needs to be downloaded and executed on users' network devices, that the concierge artificial intelligence service is server-based, and therefore can be updated based on new machine learning more frequently than when portions of artificial intelligence trained by machine learning or installed on users' network devices.

The present technology also solves a particular problem prevalent on users' network devices. Modern network devices may require many "apps", each for their specific purpose. This causes the negative result that users must remember what function each app performs, an in order to use the app, they must hunt through sometimes hundreds of apps to find the right one. The present technology overcomes these deficiencies by making user of user interfaces already available in other ubiquitous apps (i.e., a text messaging application). These and other advantages will be apparent from the description that follows.

FIG. 1 shows a block diagram of an embodiment of a network interaction system which implements and supports certain embodiments and features described herein. Certain embodiments relate to establishing a connection channel between a network device 108 (which can be operated by a user 110) and one or more endpoints. The endpoints may include a client device 130 associated with a client 125 and/or a terminal device 115 (which can be operated by an agent 120).

In some embodiments, a user 110 can be an individual accessing an online service provided by a remote server 140. In some embodiments, user 110 can be an individual looking to have a service performed on their behalf. Such a service can include conducting a transaction, participating in an interaction, getting help from an agent with a task or service, having a question answered, etc. A client 125 can be an entity that provides, operates, or runs a service, or individuals employed by or assigned by such an entity to perform the tasks available to a client 125 as described herein. The agent 120 can be an individual, such as a support agent tasked with providing support or information to the user 110 regarding the service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual attempting to book an appointment via a cell phone, a client 125 can be a company that provides medical services, and an agent 120 can be a representative employed by the company. In various embodiments, the user 110, client 125, and agent 120 can be other individuals or entities.

While FIG. 1 shows only a single network device 108, terminal device 115 and client device 130, an interaction system can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. Connection management system 150 can provide a concierge service for communicating with user 110 and the various endpoints. The concierge service can be a conversational interface used to understand natural language communications, generate replies and questions in a conversation thread, and to inform connection management system 150 of characteristics of received natural language communication.

A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 108 and one or more terminal devices 115. For example, upon receiving a communication from network device 108, connection management system 150 can estimate to which client (if any) the communication corresponds. Upon identifying a client, connection management system 150 can identify a terminal device 115 associated with the client for communication with network device 108. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. patent application Ser. No. 12/725,999, filed on Mar. 17, 2010, now U.S. Pat. No. 8,805,844, which is hereby incorporated by reference in its entirety for all purposes.

In some instances, connection management system 150 can determine whether any connection channels are established between network device 108 and an endpoint associated with a client, and, if so, whether such channel is to be used to exchange a series of communications including the communication.

Upon selecting an endpoint to communicate with network device 108, connection management system 150 can establish a connection channel between the network device 108 and the endpoint. In some instances, connection management system 150 can transmit a message to the selected endpoint. The message may request an acceptance of a proposed assignment to communicate with a network device 108 or identify that such an assignment has been generated. The message can include information about network device 108 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 108, and/or an instruction to generate and transmit a communication to network device 108.

In one instance, communications between network device 108 and an endpoint can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular item (e.g., product), connection management system 150 can automatically transmit an additional message to an endpoint containing additional information about the item (e.g., quantity of item available, links to support documents related to the item, or other information about the item or similar items).

In some embodiments, a designated endpoint can communicate with network device 108 without relaying communications through connection management system 150. One or both devices 108, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

A network device 108, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). In some embodiments, the network device 108 may be a mobile device having text messaging capabilities. Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
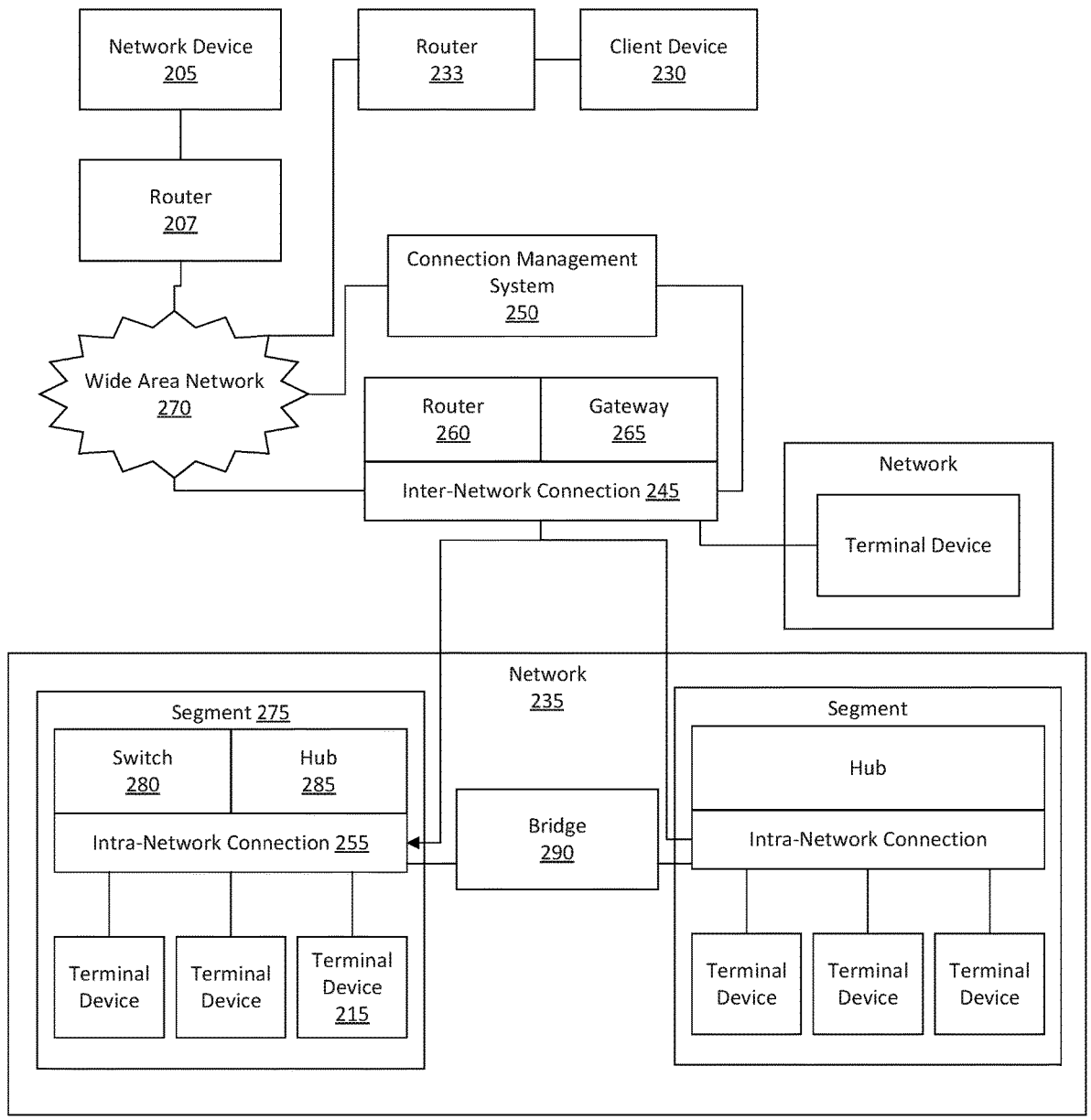
FIG. 2 shows a block diagram of an embodiment of a network interaction system that includes a connection management system.

FIG. 2 shows a block diagram of another embodiment of a network interaction system that includes a connection management system. The depicted system shows only two local-area networks 235 for simplicity, though it can be appreciated that embodiments can be extended to expand the number of local-area networks. The system includes a connection management system 250, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

Connection management system 250 can be configured to serve as a relay and/or destination address. Thus, for example, a set of network devices 205 may transmit communications, each identifying connection management system 250 as a destination. Connection management system 250 can receive each communication and can concurrently monitor a set of terminal devices (e.g., so as to generate metrics for each terminal device). Based on the monitoring and a rule, connection management system 250 can identify a terminal device 215 to which it may relay each communication. Depending on the embodiment, terminal device communications may similarly be directed to a consistent destination (e.g., of connection management system 250) for further relaying, or terminal devices may begin communicating directly with corresponding network devices. These embodiments can facilitate efficient routing and thorough communication monitoring.

It will be appreciated that many variations of FIG. 2 are contemplated. For example, connection management system 250 may be associated with a connection component (e.g., inter-network connection component 245 or intra-network connection component 255) such that an application corresponding to connection management system 250 (or part thereof) is installed on the component. The application may, for example, perform independently or by communicating with one or more similar or complementary applications (e.g., executing on one or more other components, network devices or remotes servers).

Figure 3:
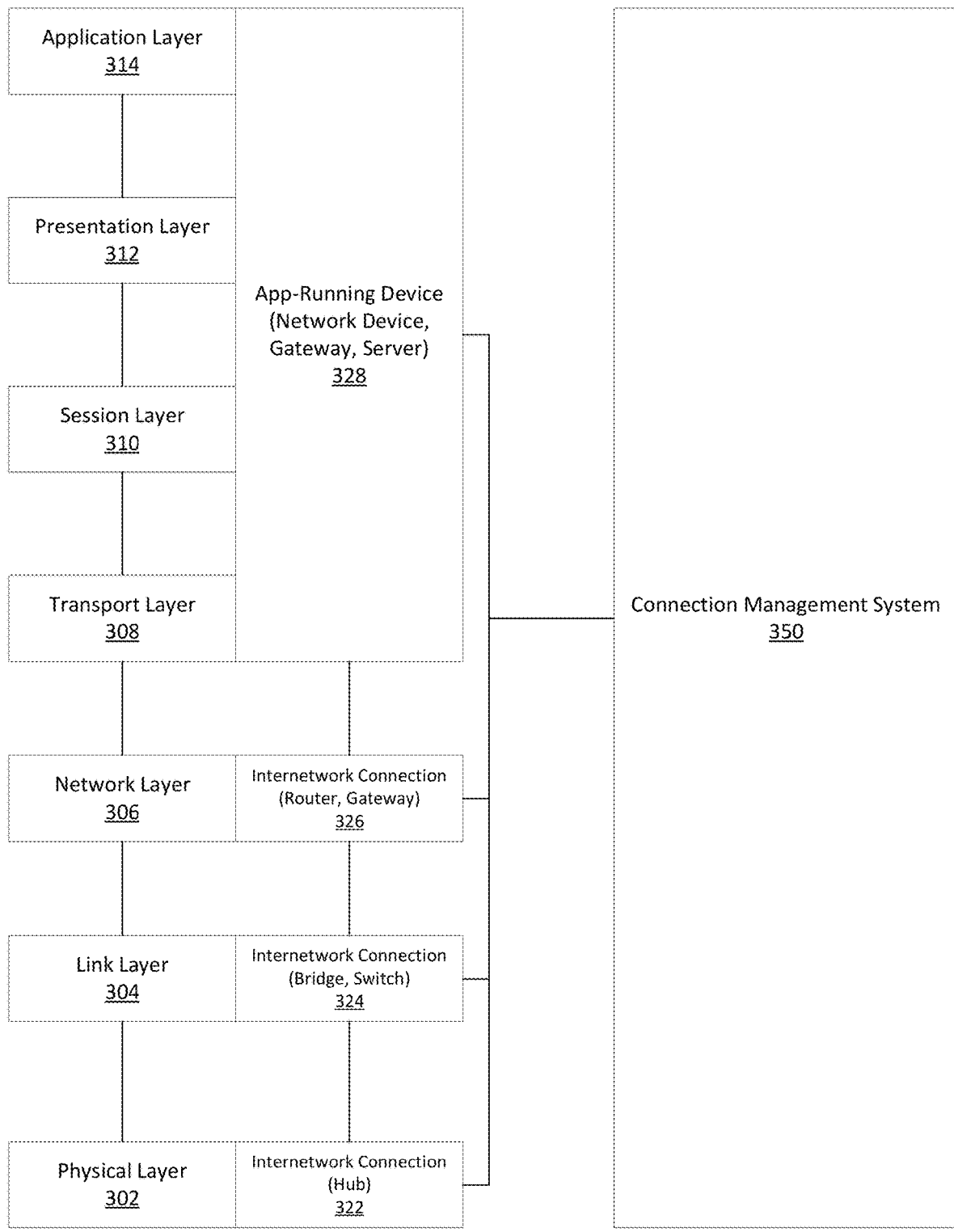
FIG. 3 shows a representation of a protocol-stack mapping of connection components' operation.

FIG. 3 shows a representation of a protocol-stack mapping of connection components' operation. More specifically, FIG. 3 identifies a layer of operation in an Open Systems Interaction (OSI) model that corresponds to various connection components.

The OSI model can include multiple logical layers 302-314. The layers are arranged in an ordered stack, such that layers 302-312 each serve a higher level and layers 304-314 is each served by a lower layer. The OSI model includes a physical layer 302. Physical layer 302 can define parameters of physical communication (e.g., electrical, optical, or electromagnetic). Physical layer 302 also defines connection management protocols, such as protocols to establish and close connections. Physical layer 302 can further define a flow-control protocol and a transmission mode.

A link layer 304 can manage node-to-node communications. Link layer 304 can detect and correct errors (e.g., transmission errors in the physical layer 302) and manage access permissions. Link layer 304 can include a media access control (MAC) layer and logical link control (LLC) layer.

A network layer 306 can coordinate transferring data (e.g., of variable length) across nodes in a same network (e.g., as datagrams). Network layer 306 can convert a logical network address to a physical machine address.

A transport layer 308 can manage transmission and receipt quality. Transport layer 308 can provide a protocol for transferring data, such as a Transmission Control Protocol (TCP). Transport layer 308 can perform segmentation/desegmentation of data packets for transmission and can detect and account for transmission errors occurring in layers 302-306. A session layer 310 can initiate, maintain and terminate connections between local and remote applications. Sessions may be used as part of remote-procedure interactions. A presentation layer 312 can encrypt, decrypt and format data based on data types known to be accepted by an application or network layer.

An application layer 314 can interact with software applications that control or manage communications. Via such applications, application layer 314 can (for example) identify destinations, local resource states or availability and/or communication content or formatting. Various layers 302-314 can perform other functions as available and applicable.

Intra-network connection components 322, 324 are shown to operate in physical layer 302 and link layer 304. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 304, as they are capable of filtering communication frames based on addresses (e.g., MAC addresses).

Meanwhile, inter-network connection components 326, 328 are shown to operate on higher levels (e.g., layers 306-314). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 350 can interact with and/or operate on, in various embodiments, one, more, all or any of the various layers. For example, connection management system 350 can interact with a hub so as to dynamically adjust which terminal devices or client devices the hub communicates. As another example, connection management system 350 can communicate with a bridge, switch, router or gateway so as to influence which terminal device the component selects as a destination (e.g., MAC, logical or physical) address. By way of further examples, a connection management system 350 can monitor, control, or direct segmentation of data packets on transport layer 308, session duration on session layer 310, and/or encryption and/or compression on presentation layer 312. In some embodiments, connection management system 350 can interact with various layers by exchanging communications with (e.g., sending commands to) equipment operating on a particular layer (e.g., a switch operating on link layer 304), by routing or modifying existing communications (e.g., between a network device and a client device) in a particular manner, and/or by generating new communications containing particular information (e.g., new destination addresses) based on the existing communication. Thus, connection management system 350 can influence communication routing and channel establishment (or maintenance or termination) via interaction with a variety of devices and/or via influencing operating at a variety of protocol-stack layers.

Figure 4:
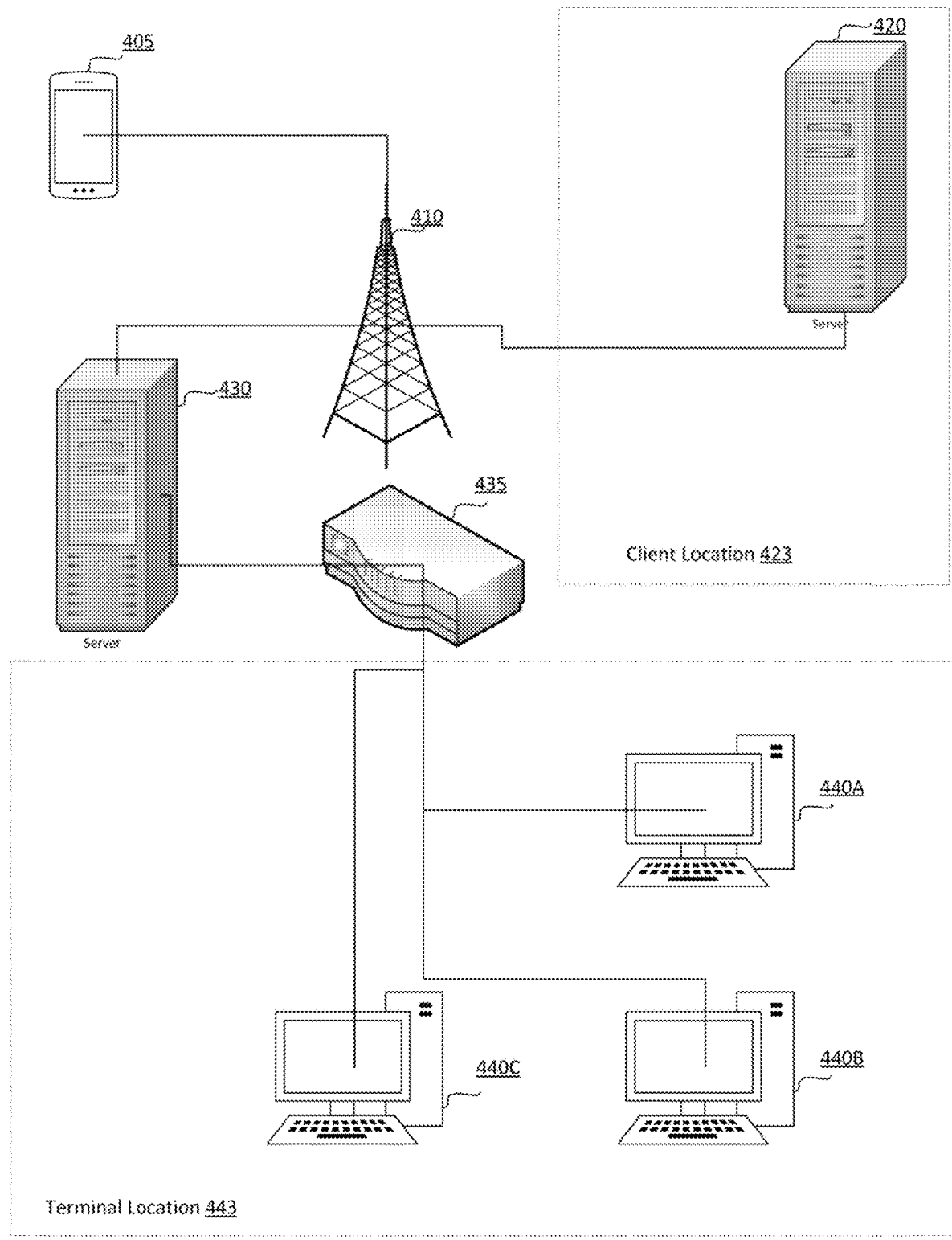
FIG. 4 represents a multi-device communication exchange system according to an embodiment.

FIG. 4 represents a multi-device communication exchange system according to an embodiment. The system includes a network device 405 configured to communicate with a variety of types of endpoint devices over a variety of types of communication channels.

In the depicted instance, network device 405 can transmit a text message communication over a cellular network (e.g., via a base station 410). The communication can be routed to a client location 423 or a terminal location 443 via a connection management system 430 that receives the communication and identifies which endpoint device is to respond to the communication. Such determination can depend on identifying a client to which that communication pertains (e.g., based on a content analysis or user input indicative of the client) and determining one or more metrics for each of one or more terminal devices associated with the client. For example, in FIG. 4, each cluster of terminal devices 440a-c can correspond to a different client. The terminal devices may be geographically co-located or dispersed. The metrics may be determined based on stored or learned data and/or real-time monitoring (e.g., based on availability).

Connection management system 430 can communicate with various terminal devices and other components via one or more routers 435 or other inter-network or intra-network connection components. Connection management system 430 may collect, analyze and/or store data from or pertaining to communications, terminal-device operations, client rules, and/or user-associated actions (e.g., online activity) at one or more data stores. Such data may influence communication routing.

Network device 405 may have the capability to generate and transmit a text (e.g., SMS) message, which may be routed to the client device 420 via the connection management system 430 in some embodiments. The client device 420 may be capable of receiving and processing messages from the connection management system 430 in some format (i.e., in text message format or in another format converted by the connection management system 430). Server 420 may receive and respond to messages from network device 405 for information regarding the goods or services provided at the client location 423, such as product information, service information, and the like.

Figure 5:
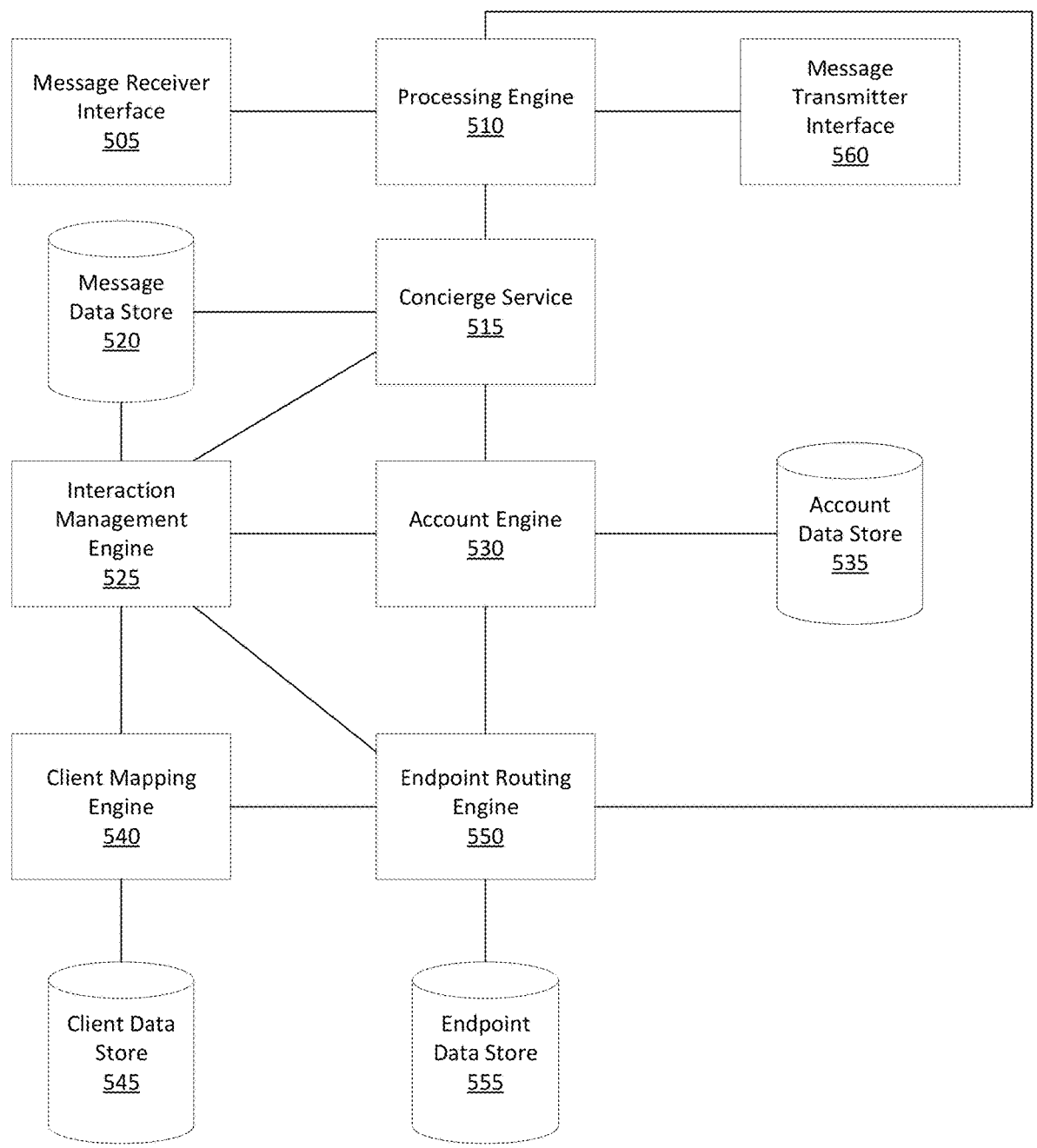
FIG. 5 shows a block diagram of an embodiment of a connection management system.

FIG. 5 shows a block diagram of an embodiment of a connection management system. A message receiver interface 505 can receive a message. In some embodiments, the message can be received, for example, as part of a communication transmitted by a source device (e.g., housed separately from the connection management system or within a same housing), such as a network device or endpoint. In some embodiments, the communication can be part of a series of communications or a communication exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at a user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client that can be sent to concierge service 515.

A processing engine 510 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A concierge service 515 may assess the (e.g., extracted or received) message. The assessment can include identifying, for example, one or more intents for the message. Examples of intents can include (for example) topic, sentiment, complexity, and urgency. A topic can include, but it not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some embodiments, an intent can be clarified by engaging a user in a conversation that can include clarifying questions, or simply requesting additional information.

In some embodiments, concierge service 515 can utilize a conversational interface to understand the natural language communications, to recognize the intent of the communications, and to engage the user in a dialog. Conversational interfaces are a type of artificial intelligence, trained using machine learning or deep learning algorithms. In addition to interpreting language, conversational interfaces can also communicate back to users through questions and statements that make sense in the context of a dialog between the user and the conversational interface. Conversational interfaces are sometimes known as "bots" and "chat bots." One example of a conversational interface is known as Lex, by Amazon Web Services.

In some embodiments, concierge service 515 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Concierge service 515 can store a message, message metric and/or message statistic in a message data store 520. Each message can also be stored in association with other data (e.g., metadata), such as data identifying a corresponding source device, destination device, network device, endpoint, client, one or more categories, one or more stages and/or message-associated statistics). Various components of the connection management system can query message data store 520 to retrieve query-responsive messages, message metrics and/or message statistics.

An interaction management engine 525 can determine to which endpoint a communication is to be routed and how the receiving and transmitting devices are to communicate. Each of these determinations can depend, for example, on whether a particular network device (or any network device associated with a particular user) has previously communicated with an endpoint in a set of endpoints (e.g., any endpoint associated with the connection management system or any endpoint associated with one or more particular clients).

In some embodiments, when a network device (or other network device associated with a same user or account) has previously communicated with a given endpoint (e.g., about matters relating to a client), communication routing can be generally biased towards the same endpoint. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more endpoints); whether the endpoint is available; and/or a predicted response latency of the endpoint. Such factors may be considered absolutely or relative to similar metrics corresponding to other endpoints. A re-routing rule (e.g., a client-specific or general rule) can indicate how such factors are to be assessed and weighted to determine whether to forego agent consistency.

When a network device (or other network device associated with a same user or account) has not previously communicated with a given endpoint (e.g., about matters relating to a client), an endpoint selection can be performed based on factors such as, for example, an extent to which various agents' knowledge base corresponds to a communication topic, availability of various agents at a given time and/or over a channel type, types and/or capabilities of endpoints, a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. An endpoint selection can then be made by comparing endpoints' scores (e.g., to select a high or highest score).

With regard to determining how devices are to communicate, interaction management engine 525 can (for example) determine whether an endpoint is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints. Appreciably, some communication types will result in real-time communication (e.g., where fast message response is expected), while others can result in asynchronous communication (e.g., where delays (e.g., of several minutes or hours) between messages are acceptable).

In some embodiments, the communication type can be a text messaging or chat application. These communication technologies provide the benefit that no new software needs to be downloaded and executed on users' network devices.

Further, interaction management engine 525 can determine whether a continuous channel between two devices should be established, used or terminated. A continuous channel can be structured so as to facilitate routing of future communications from a network device to a specified endpoint. This bias can persist even across message series (e.g., days, weeks or months). In some embodiments, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and endpoint. The score may pertain to an overall match or one specific to a given communication or communication series. Thus, for example, the score may reflect a degree to which a given endpoint is predicted to be suited to respond to a network-device communication. In some embodiments, a score analysis can be used to identify each of an endpoint to route a given communication to and whether to establish, use or terminate a connection. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different endpoint.

To illustrate, a set of three endpoints associated with a client may be evaluated for potential communication routing. A score may be generated for each that pertains to a match for the particular communication. Each of the first two endpoints may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third endpoint is immediately available. It may be predicted that the second endpoint will be available for responding within 15 minutes, but that the first endpoint will not be available for responding until the next day. Thus, a fast-response sub-score for the first, second and third devices may be 1, 3 and 10. Finally, it may be estimated a degree to which an agent (associated with the endpoint) is knowledgeable about a topic in the communication. It may be determined that an agent associated with the third endpoint is more knowledgeable than those associated with the other two devices, resulting in sub-scores of 3, 4 and 9. In this example, the rule does not include weighting or normalization parameters (though, in other instances, a rule may), resulting in scores of 14, 12, and 19. Thus, the rule may indicate that the message is to be routed to a device with the highest score, that being the third endpoint. If routing to a particular endpoint is unsuccessful, the message can be routed to a device with the next-highest score, and so on.

A score may be compared to one or more absolute or relative thresholds. For example, scores for a set of endpoints can be compared to each other to identify a high score to select an endpoint to which a communication can be routed. As another example, a score (e.g., a high score) can be compared to one or more absolute thresholds to determine whether to establish a continuous channel with an endpoint. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 525 can interact with an account engine 530 in various contexts. For example, account engine 530 may look up an identifier of a network device or endpoint in an account data store 535 to identify an account corresponding to the device. Further, account engine 530 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 525 can alert account engine 530 of various connection-channel actions, such that account data store 535 can be updated to reflect the current channel data. For example, upon establishing a channel, interaction management engine 525 can notify account engine 530 of the establishment and identify one or more of: a network device, an endpoint, an account and a client. Account engine 530 can subsequently notify a user of the channel's existence such that the user can be aware of the agent consistency being availed.

Interaction management engine 525 can further interact with a client mapping engine 540, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 540 may detect) or included as other data in a message-inclusive communication. Client mapping engine 540 may then look up the identifier in a client data store 545 to retrieve additional data about the client and/or an identifier of the client.

In some embodiments, a message may not particularly correspond to any client. For example, a message may include a general query. Client mapping engine 540 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint).

Client data store 545 can include identifications of one or more endpoints (and/or agents) associated with the client. An endpoint routing engine 550 can retrieve or collect data pertaining to each of one, more or all such endpoints (and/or agents) so as to influence routing determinations. For example, terminal routing engine 550 may maintain an endpoint data store 555, which can store information such as endpoints' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun.

It will be appreciated that, in various contexts, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When interaction management engine 525 has identified an endpoint to involve in a communication exchange or connection, it can notify terminal routing engine 550, which may retrieve any pertinent data about the endpoint from endpoint data store 555, such as a destination (e.g., IP) address, device type, protocol, etc. Processing engine 510 can then modify the message-inclusive communication or generate a new communication (including the message) so as to have a particular format, comply with a particular protocol, and so on. In some embodiments, a new or modified message may include additional data, such as account data corresponding to a network device, a message chronicle, and/or client data.

A message transmitter interface 560 can then transmit the communication to the endpoint. The transmission may include, for example, a wired or wireless transmission to a device housed in a separate housing. The endpoint can include an endpoint in a same or different network (e.g., local-area network) as the connection management system. Accordingly, transmitting the communication to the endpoint can include transmitting the communication to an inter- or intra-network connection component.

Systems and methods for dynamically switching between bots, sometimes referred to as a "concierge service" herein, and endpoints during communication sessions with network devices (e.g., operated by users) is provided. In some implementations, a concierge service 515 can be configured to autonomously chat with users. Further, the concierge service 515 can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, generating reports, tracking open conversation threads, and other suitable capabilities. In some implementations, while the concierge service 515 is communicating with a user in a chat session, a communication server can automatically and dynamically determine to transfer the chat session to an endpoint. For example, the concierge service 515 can communicate with users about certain tasks (e.g., updating a database record associated with a user), whereas, endpoints can communicate with users about more difficult tasks (e.g., communicating using a communication channel to solve a technical issue).

In some implementations, determining whether to transfer a chat session between the concierge service 515 and the endpoints can be based on an analysis of one or more characteristics of the messages in a communication session. Further, a dynamic sentiment score can be generated for the messages. For example, in cases where the sentiment score indicates that the user is frustrated with the concierge service 515, the system can automatically switch the concierge service 515 with an endpoint to communicate with the user. See U.S. Ser. No. 15/171,525, filed Jun. 2, 2016, now U.S. Pat. No. 10,142,908, the disclosure of which is incorporated by reference herein in its entirety for all purposes. In some examples, determining whether to switch between the concierge service 515 and endpoints can be performed without a prompt from a user. The determination can be performed automatically at the communication server based any number of factors, including characteristics of the current messages in the chat session, characteristics of previous messages transmitted by the user in previous chat sessions, a trajectory of a characteristic (e.g., a sentiment) over multiple messages in a conversation, or additional information associated with the user (e.g., profile information, preference information, membership information, and other suitable information associated with the user).

Figure 6:
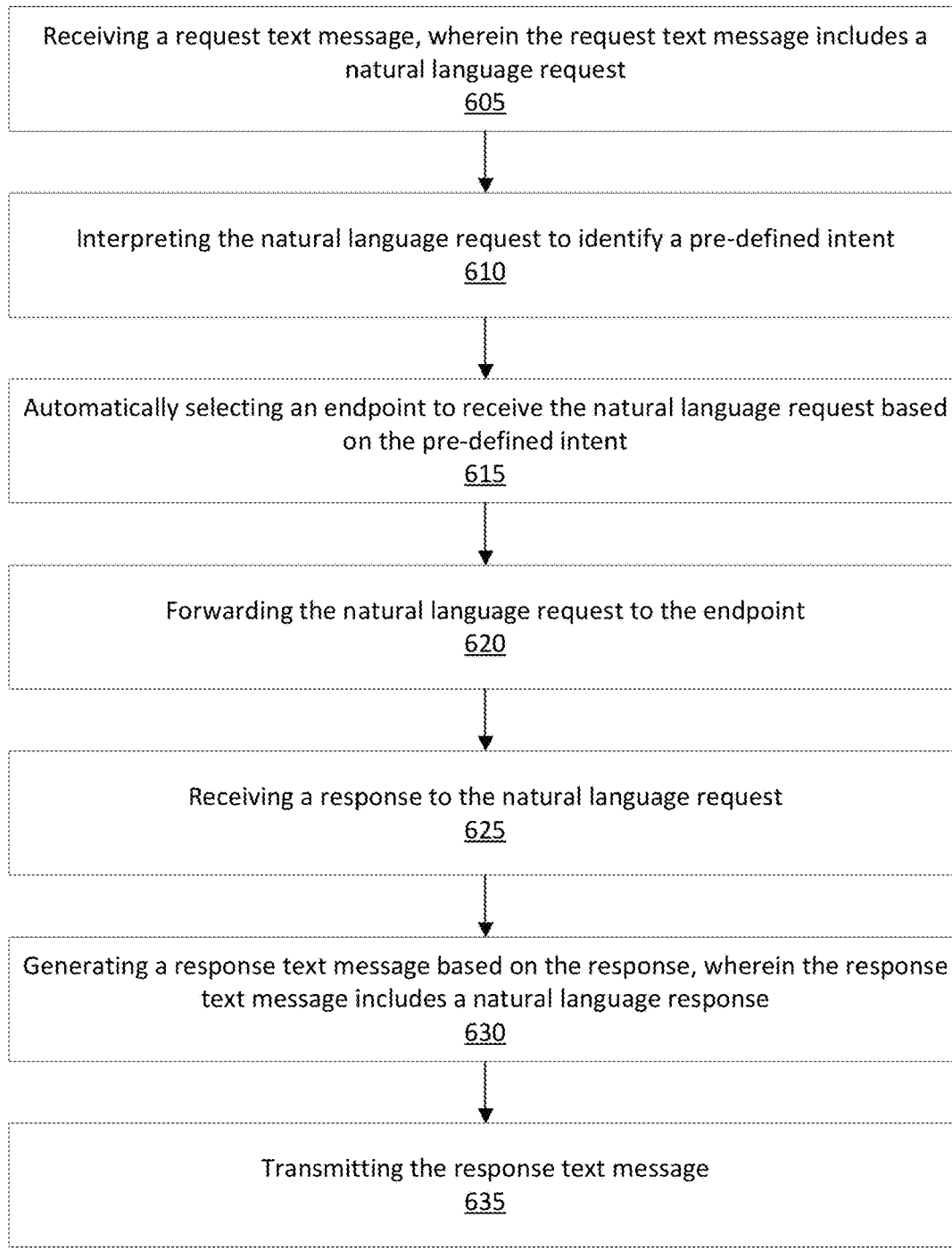
FIG. 6 is a flowchart illustrating a method of dynamic text message processing.

FIG. 6 is a flowchart illustrating a method of dynamic text message processing. The method of FIG. 6 can be performed, by example, by a connection management system as described herein. In some embodiments, the method of FIG. 6 can be performed by a concierge service or bot (as used interchangeably herein).

At step 605, a request text message can be received. In some embodiments, the request text message may be received from a network device, such as a mobile device or another device capable of generating and transmitting text (e.g., SMS) messages. The request text message may include a request in natural language. As used herein, natural language may refer to words or combinations of words used conversationally, as opposed to specialized or specific words or language otherwise necessary to provoke actions or responses from a machine. In some embodiments, the natural language request may be a request for a resource. For example, the request may be a request for data or information.

At step 610, the natural language request may be interpreted to identify a pre-defined intent. In some embodiments, the words of the natural language request may be parsed to identify any keywords indicative of a given intent. For example, the natural language request may be, "I want to order some food for delivery." The request can be parsed to identify the operative words of the request, i.e., "order", "food", and "delivery". The associated pre-defined intent may be "food delivery".

At step 615, an endpoint may be automatically selected to receive the natural language request based on the pre-defined intent. The endpoint may be, for example, a client device or a terminal device as described herein. The endpoint may be selected from a plurality of endpoints. In other words, the same endpoint may not receive every natural language request. For example, the endpoint for the pre-defined intent of "food delivery" may be a restaurant, concessions stand, or convenience store, which may operate a client device, such as a point-of-sale (POS) system. However, a pre-defined intent of "grill information" may select an endpoint of a terminal device associated with an agent capable of accessing and providing information on grills.

At step 620, the natural language request may be forwarded to the endpoint. In some embodiments, the pre-defined intent may alternatively or additionally be forwarded to the endpoint. The request may be forwarded to the endpoint over any communication channel. For example, although the request was received in the form of a text message, the request may be translated into another form or format used to communicate with the client device or the terminal device. For example, the request may be forwarded as an e-mail, as a data object, etc. In addition, the request may be forwarded over any suitable network, including a cellular network, a wide area network, a local area network, etc. In other words, although the request text message was received over a cellular network, any suitable network may be used to forward the request to a client device or a terminal device.

At step 625, a response to the natural language request may be received. The response may come from the endpoint, either directly or indirectly. For example, the endpoint may have been a client device associated with a restaurant. However, the client may have reviewed the request and determined that it should be forwarded to a concessions stand. In this example, a client device associated with the concessions stand may formulate a response to the request. The response to the request may include any suitable data. For example, the response may include a menu or presentation of options available, a confirmation, etc. As discussed herein, the response may or may not be received over the same communications channel or in the same format as the request.

At step 630, a response text message may be generated based on the response. The response text message may include a natural language response. In some embodiments, the response may be received from an endpoint in natural language. In some embodiments, the response may be received from the endpoint in another format, and converted into natural language suitable for the network device. In embodiments in which the natural language request is a request for a resource, the response text message may include the resource. For example, if the request is for information on grills, the response text message may provide that information.

At step 635, the response text message is transmitted. In some embodiments, the response text message is transmitted to the network device that generated the request text message. In some embodiments, the response text message may be transmitted to another endpoint, including another network device, a client device, a terminal device, etc. For example, if a request text message indicated that information be sent to a third party device, the response text message may be transmitted to the third party device.

In some embodiments, follow-up actions may be taken. In some embodiments, a second request text message may be received. The second request text message may include a second natural language request. The second natural language request may be interpreted to identify a second pre-defined intent. An alternate endpoint may be automatically selected to receive the second natural language request based on the second pre-defined intent. The second natural language request may be forwarded to the alternate endpoint. In other words, different text messages may be routed to different endpoints, and more than one communication channel may be open to communicate with the same network device for different intents.

In some embodiments, a second request text message may be received. The second request text message may include a second natural language request. An alternate endpoint may be automatically selected to receive the second natural language request based on the endpoint. The second natural language request may be forwarded to the alternate endpoint. In other words, the endpoint for a new request may be selected based on the endpoint for a previous request in some embodiments.

The method described herein with respect to FIG. 6 may be advantageous for a number of reasons. For example, the concierge service may communicate with users via text messaging, which requires no additional or specialized software on a mobile device. In addition, the concierge service and the user may communicate with each other in natural language and conversationally, as opposed to using structured or specialized terms or formats. However, the concierge service is also able to communicate with other devices, such as client devices and terminal devices, in their preferred formats and their preferred communication channels as well. In other words, users may be able to use a communication channel or application of choice, such as Apple Business Chat or Google RBM.

Figure 7:
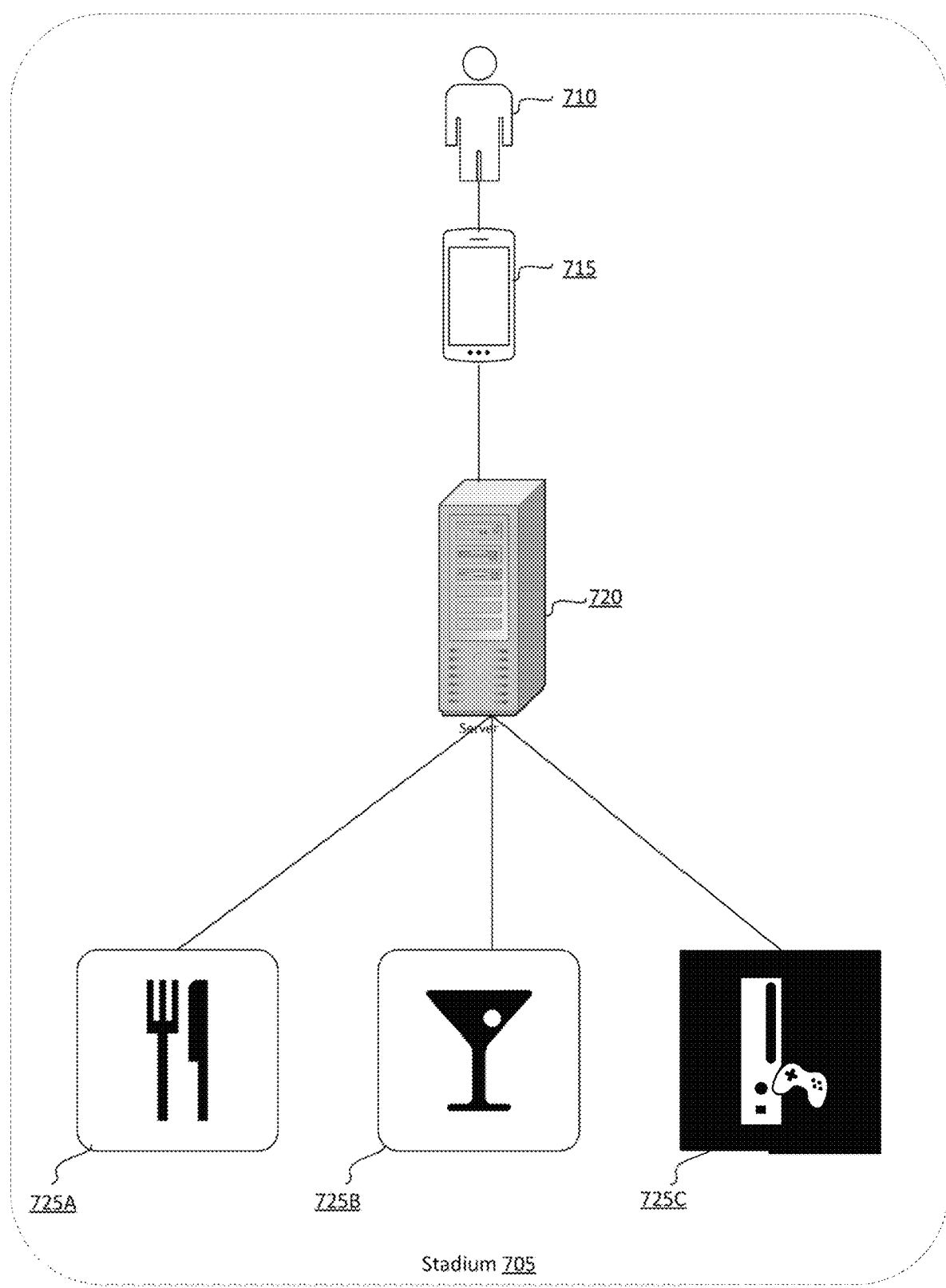
FIG. 7 represents an exemplary system for dynamic text message processing in a stadium environment.

FIG. 7 represents an exemplary system for dynamic text message processing. In the example illustrated in FIG. 7, the system may be used in a stadium 705 environment. For example, user 710 may be in attendance at a sporting event at stadium 705. User 710 may be seated in a particular section and row. User 710 may operate his network device 715 to communicate with the communication management system 720. For example, user 710 may use network device 715 to formulate a text message to a designated phone number associated with the communication management system 720. The text message may be in natural language.

In other words, user 710 may use network device 715 to exchange communications over the cellular network with the communication management system 720. Although illustrated as being within the stadium 705, it is contemplated that the communication management system 720 may be positioned locally or remotely with respect to the stadium 705. For example, the communication management system 720 may be located in the cloud in some embodiments.

The communication management system 720 may be in operative communication with a plurality of service providers. For example, the communication management system 720 may be in communication with a food provider 725A, a beverage provider 725B, and a gaming provider 725C. Although shown and described with respect to three providers 725A-C, it is contemplated that the communication management system 720 may be in communication with any number and type of providers. In addition, as shown and described herein, the communication management system 720 may also be in operative communication with terminal devices and agents positioned within or outside of the stadium 705.

When a text message is received from the network device 715, the communication management system 720 may interpret the text message to determine which of the providers 725A-C to forward a request to. The communication management system 720 may translate the request in the text message to another format in order to communicate effectively with providers 725A-C. In addition, the communication management system 720 may communicate over a different communication channel with the providers 725A-C than with the network device. For example, the communication management system 720 may communicate with the network device over text messages on the cellular network, but communicate via a different method with providers 725A-C.

Figure 8A:
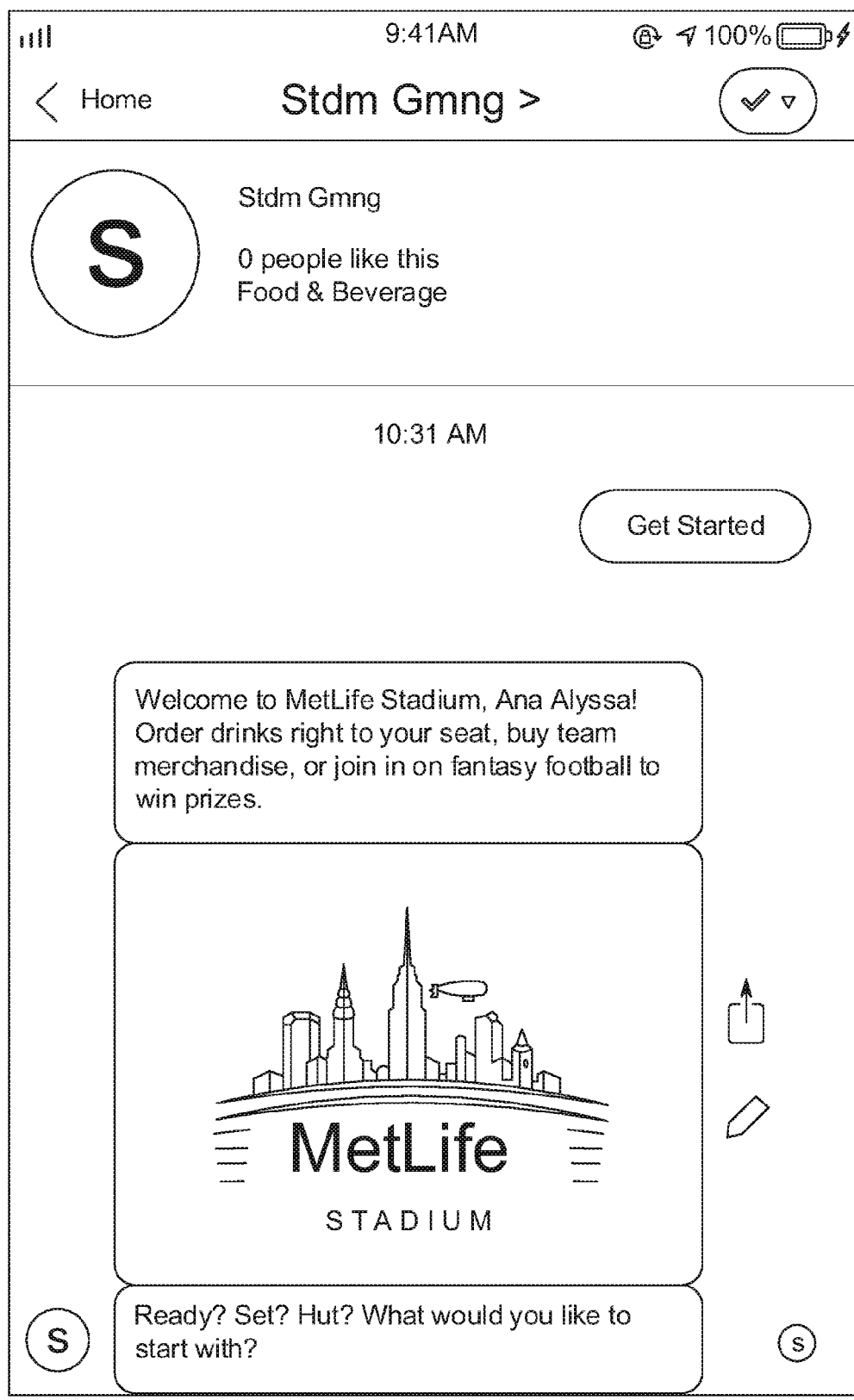
FIGS. 8A-8H show example user interfaces for communications facilitated by the connection management system.

Further illustration may be made with reference to FIGS. 8A-8H. FIGS. 8A-8H show example user interfaces for communications facilitated by the connection management system. FIG. 8A illustrates a text message sent to initiate a communication session with the connection management system from a stadium during a football game. FIG. 8A illustrates a screen shot of a network device sending a text message to a phone number associated with the connection management system stating "Get Started". In response, the connection management system may respond with a list of available services, such as "order drinks", "buy team merchandise", and "join in on fantasy football". As shown in FIG. 8A, both the user operating the network device and the connection management system may communicate with each other in natural language.

Figure 8B:
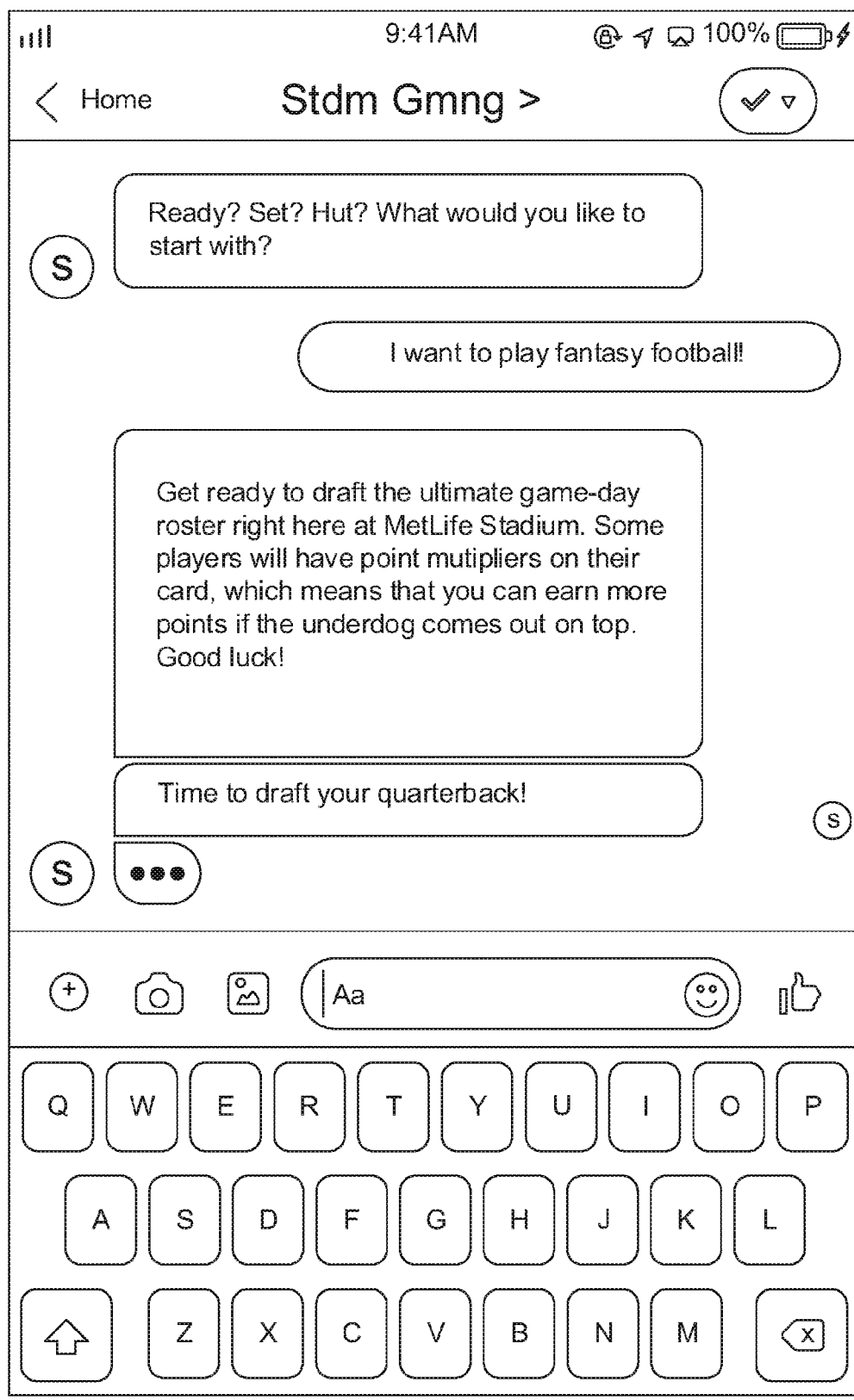
Figure 8C:
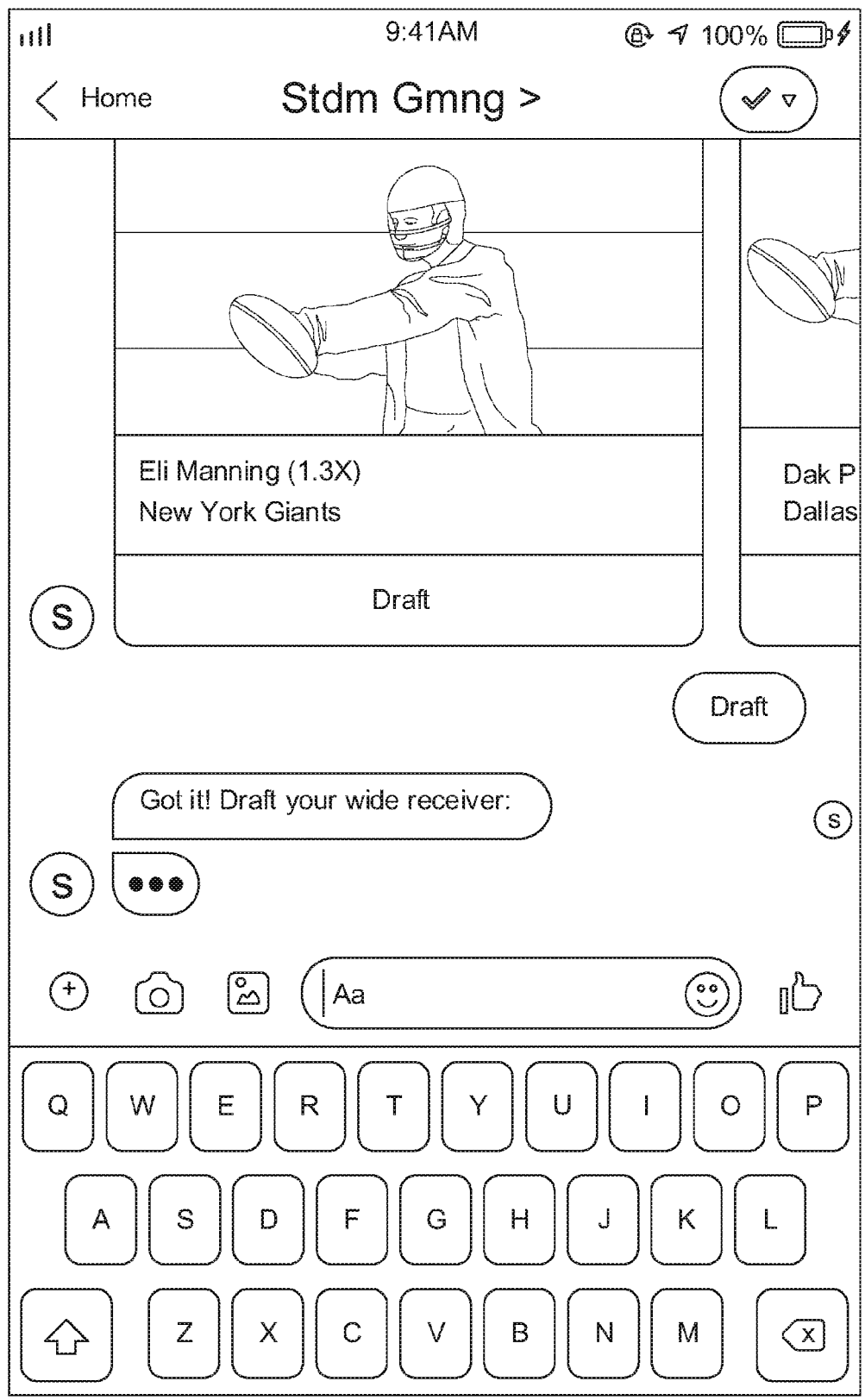

FIG. 8B illustrates continued communications between the network device and the communications management system. The connection management system may prompt the user to select an option of available services. The user may respond in natural language that "I want to play fantasy football!". The connection management system may parse this text message to identify the intent of the user. For example, the connection management system may identify "fantasy football" in the text message and initiate a fantasy football session with the network device. For example, the connection management system may formulate the intent into a command to a fantasy football gaming server (e.g., ESP or Yahoo! Sports) to begin a fantasy football gaming session. The connection management system may provide instructions and prompts in order to facilitate the fantasy football session. In other words, the connection management system may act as a middleman between the fantasy football gaming server and the user's network device, such that messages exchanged are in natural language and seem conversational. For example, as shown in FIGS. 8B and 8C, the connection management system may prompt the user to draft players for the fantasy football team. As shown in FIG. 8C, pictures, icons, and/or interactive elements may be provided in text messages to the network device in order to facilitate the communication. Although described herein as being facilitated directly by the connection management system, it is contemplated that communications may instead be routed through the connection management system from a client device or terminal device.

Figure 8D:
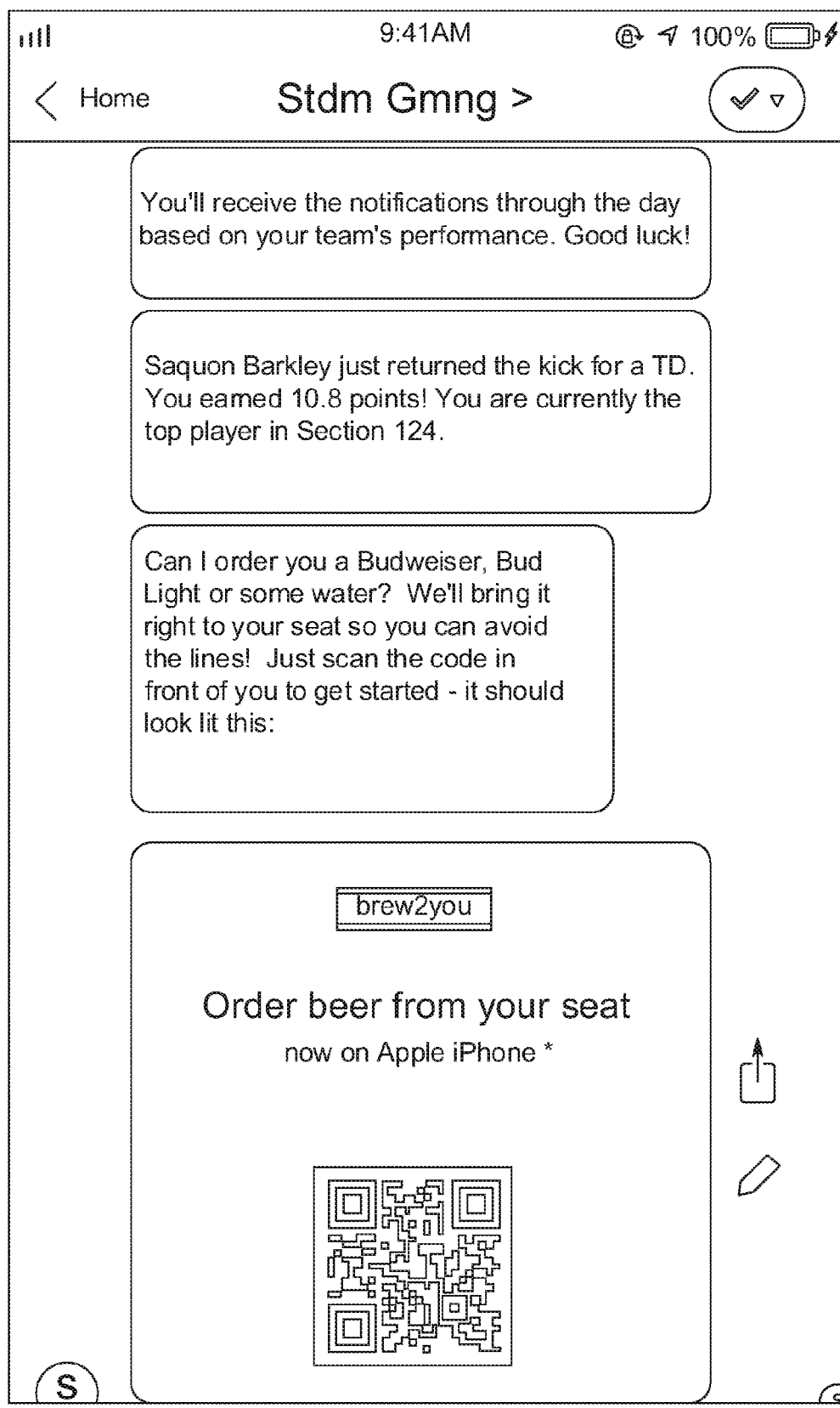
Figure 8E:
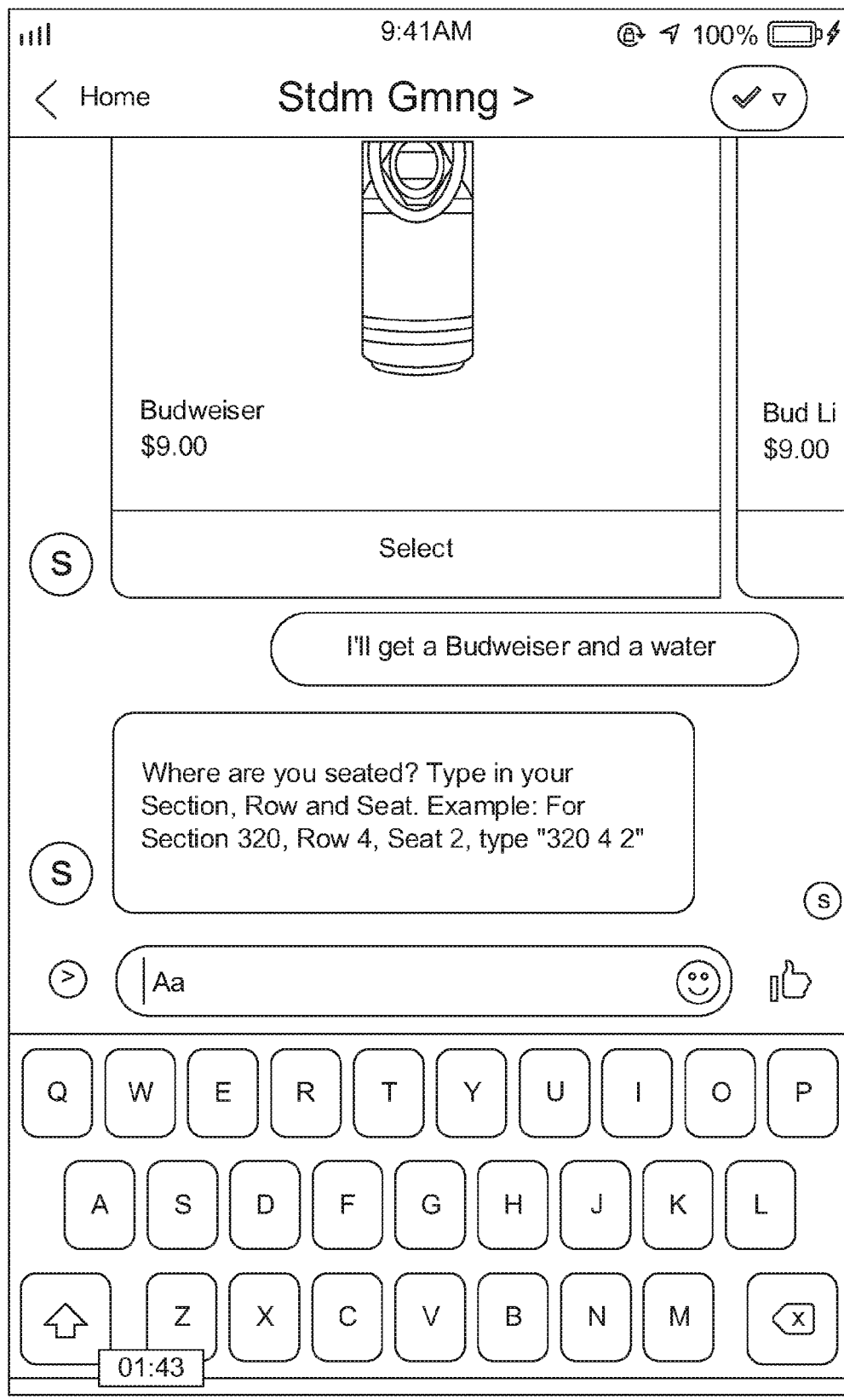
Figure 8F:
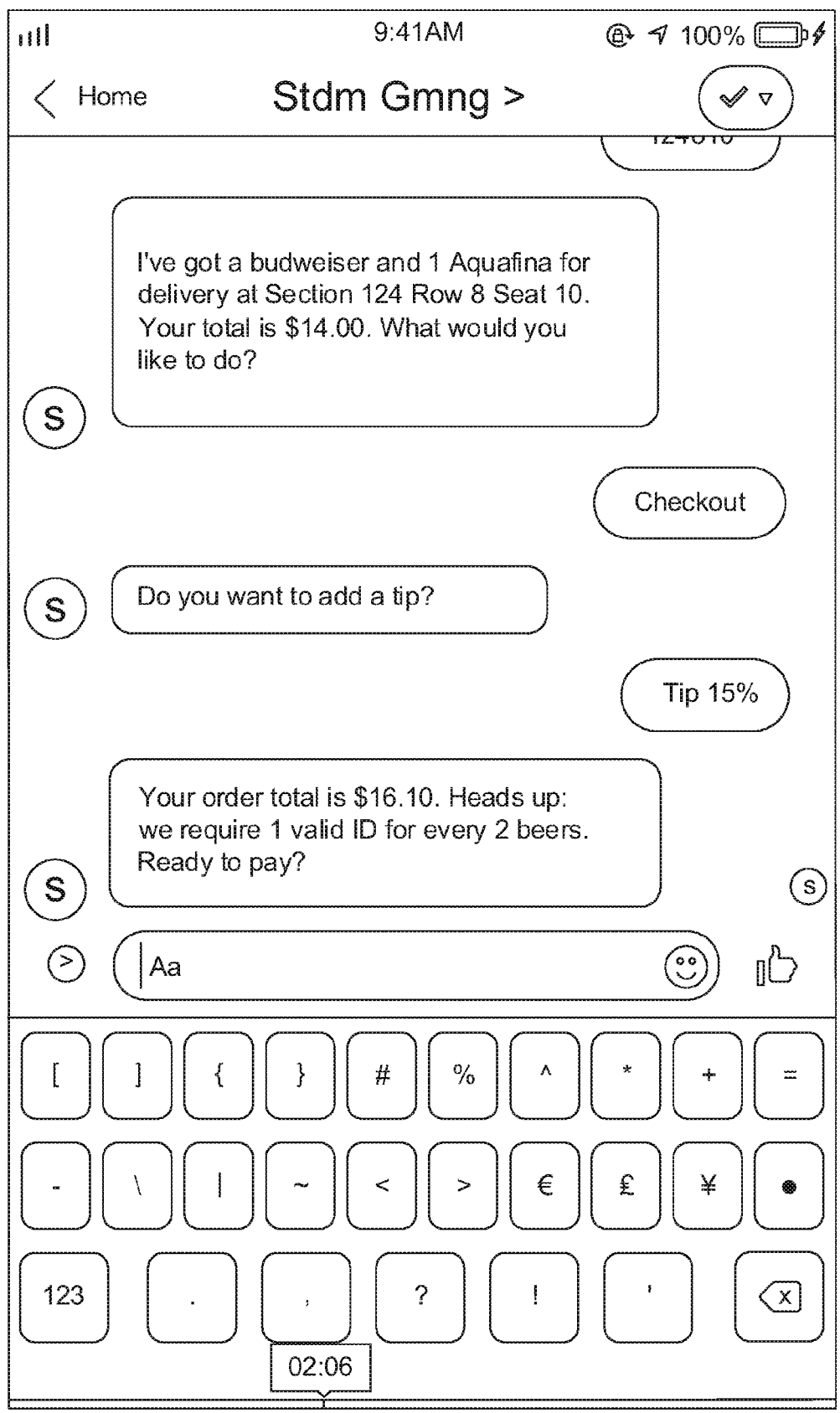

It is contemplated that requests from network devices may be in other forms, i.e., forms other than textual messages. For example, FIG. 8D illustrates a QR code in a text message sent to the network device that would allow the network device to order beverages to be delivered to the user's seat in the stadium. As shown in FIG. 8D, the requests and responses to fantasy football may be seamlessly weaved in with requests and responses to beverage ordering. In other words, multiple different conversations can be carried on at one time. In this example, the user may subsequently use his or her network device to initiate a conversation about ordering beverages. While discussing the beverage purchase, the connection management system may forward messages to the network device about fantasy football status. The connection management system may maintain state and context of each conversation thread, i.e., where the conversation left off on fantasy football status, what the current beverage order is, what the past beverage order was, what merchandise was in the last inquiry, etc. As shown in FIG. 8E, a list of options available for beverages may be presented in graphical and/or textual format and can be ordered by the user in natural language. The connection management system (or a client or terminal device) may prompt the user for his section, row, and seat in order to deliver the desired products. As shown in FIG. 8F, the connection management system may facilitate checking out, tipping, and calculating total costs. The connection management system may also interface with other applications or information available on the network device (e.g., Apple Pay) to facilitate payment to the client device providing the goods or services. In addition, the connection management system may incorporate advertisements and/or sponsorships into the conversation.

Figure 8G:
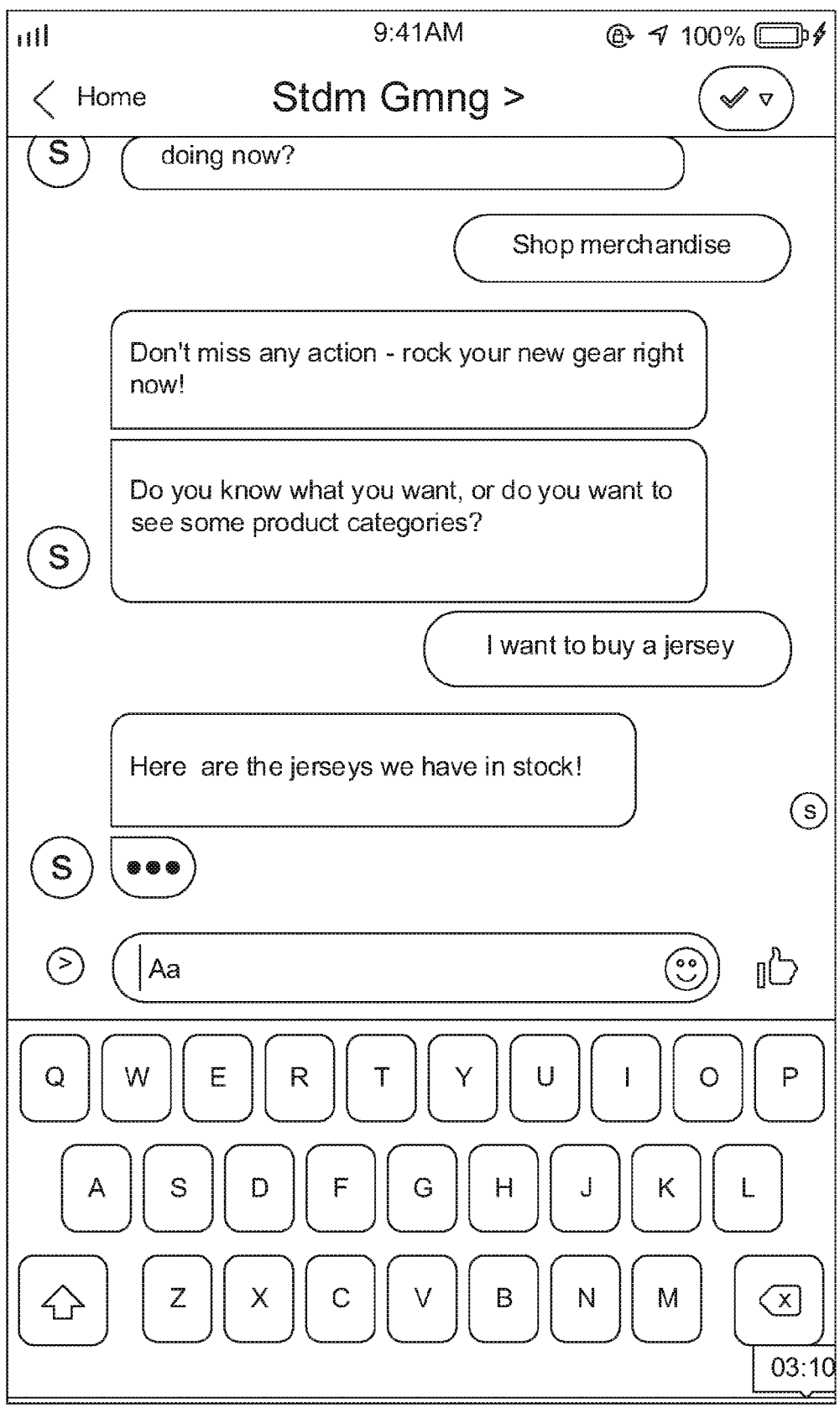
Figure 8H:
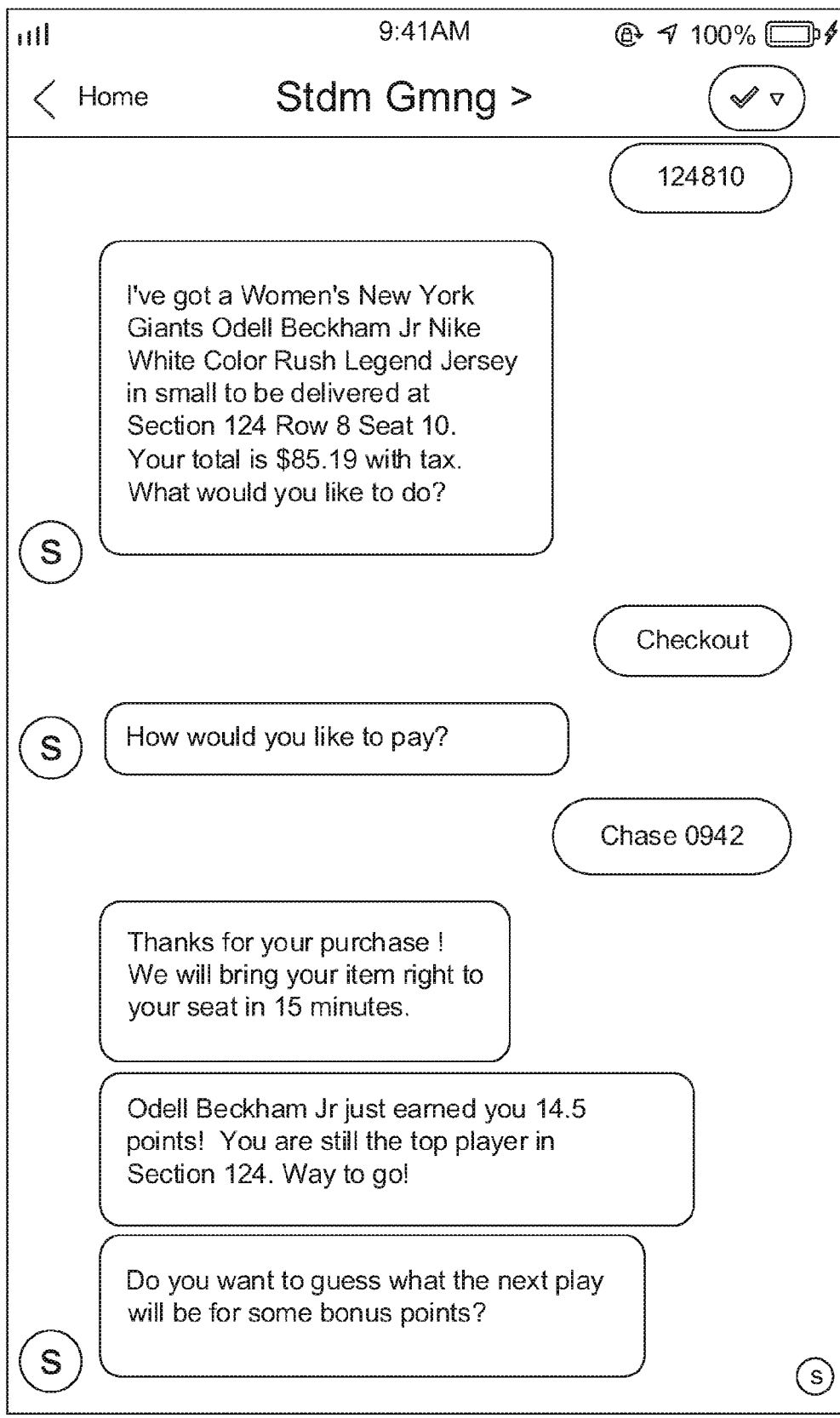

As shown in FIG. 8G, communications may continue in natural language to request to shop merchandise. For example, the user may send a text message stating that "I want to buy a jersey". The connection management system may interface with a client device associated with a team apparel store to provide a list of jerseys that are in stock to the network device. As shown in FIG. 8H, the connection management system can facilitate the user ordering a jersey with his network device and paying for the jersey using a stored credit card or payment type. In other examples, the user may use the connection management system in the method described to buy or sell tickets to another game, to pay for parking in advance or on the way out of the garage, etc.

As also shown in FIG. 8H, the connection management system may seamlessly communicate between disparate topics with different endpoints. For example, FIG. 8H illustrates messages about apparel, messages about payment, messages about fantasy football, and messages initiating a game collecting additional fantasy football points. It is contemplated that points collected and tracked by the connection management system may be used by the user of the network device to redeem for goods or services either related or unrelated to the points.

Although shown and described with respect to FIGS. 8A-8H as being used in a stadium location, it is contemplated that embodiments may be used in a plurality of locations in which communication, information, goods, or services are desirable. In one example, a user could be in a movie theater. The user could text message a phone number associated with the movie theater to order concessions, souvenirs, other movie tickets, and the like. The user could specify his or her seating location in the movie theater to have the ordered items delivered.

In another example, a user could be on an airplane. The user could text message a phone number associated with the flight to order food, beverages, entertainment, hotels, rental cars, upgrades, activities, or future flights. The user could specify his or her seat on the plane, and the physically deliverable items could be brought to the user's seat. Other items could be delivered to the user's mobile device (e.g., music, movies, games, travel confirmations, etc.).

In still another example, a user could arrive at a hotel. The user could text message a phone number associated with a concierge service to order room service, make reservations at area restaurants, make reservations for activities, make reservations for nightlife, order items from the hotel convenience store, order in-room entertainment, and the like. In one embodiment, the user could specify his or her room location in the hotel in order to have the items be delivered and the room be charged. In another embodiment, the concierge service could look up the user's room number from information provided by the user, or by using the phone number that the user sent the text message from. The physically deliverable items can be delivered to the user's room. Other items can be delivered electronically, e.g., to the user's mobile device, to the television, etc.

In still another example, a user could arrive at a restaurant to watch a dancing competition. The user could text message a phone number associated with the restaurant to order food and beverages to his or her seat. The user could also engage with the restaurant via text message to play trivia about the contestants in the competition and place bets on their order of elimination from the show in order to earn points. At the end of the show, the user could cash out his or her points for food, beverages, merchandise, or gift cards, or could bank the points for future visits (e.g., for another episode of the competition the following week). Thus, loyalty is earned toward the restaurant.

Although described herein as the user initiating a text message communication, it is contemplated that a service could alternately initiate a text message communication. For example, an airplane service could initiate a text message communication with users that purchased tickets for that flight (and optionally, that also purchased WiFi onboard) once the plane is above 10,000 feet. In another example, a hotel could initiate a text message communication with users that provided a mobile phone number upon making the reservation or at check-in. These text message communications may be initiated at any suitable time, such as the time of check-in, after check-in, or even prior to check-in to ensure a good experience upon arrival. It is further contemplated that a text message communication may be initiated on either end when the user's device is detected to be at or near a particular location, e.g., by using the Global Positioning System (GPS), Bluetooth, or the like.

Although shown and described herein primarily with respect to one-on-one purchases and gaming between the user of the network device and the connection management system, it is contemplated that the connection management system may facilitate large-scale entertainment options amongst a plurality of users. For example, a multiplayer live game may be facilitated between spectators at a stadium, as well as spectators watching remotely. The game could be, for example, a trivia game carried out throughout the course of the event. A scoreboard may be displayed in the experience on the network device and/or on a screen at the stadium event. Accrued points could be stored or used to determine prizes, as discussed further herein. Similarly, this concept may be applied to patrons at a restaurant, at a movie theater, watching a television show, on an airplane, at a hotel, and the like.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   maintaining a state for a plurality of different conversations being conducted concurrently, wherein the plurality of different conversations use a same text messaging interface;
   receiving a plurality of request text messages associated with the plurality of different conversations being conducted concurrently using the same text messaging interface, wherein the plurality of request text messages for the different conversations appear in a woven display in the text messaging interface;
   identifying a first weight for a first subset of request text messages, wherein a second weight is identified for a second subset of the request text messages;
   automatically selecting a first endpoint device from a plurality of endpoint devices for first one of the concurrent conversations corresponding to the first subset of the request text messages associated with a first service type based on the first weight identified for the first subset of request text messages, and wherein the first endpoint device is associated with a first service provider and only the first subset of the request text messages is routed to the first endpoint device;
   routing only the second subset of the request text messages to a second endpoint device from the plurality of endpoint devices for a second one of the concurrent conversations based on the second weight identified for the second subset of the request text messages, wherein the second endpoint device is associated with a second service provider associated with a second service type, and wherein the second endpoint device is distinct from the first endpoint device;
   formulating a command based on the first subset of the request text messages and the first endpoint device, wherein when the formulated command is received at the first endpoint device, the first endpoint device generates a response to the formulated command that is based on a state associated with the first conversation;
   generating a response text message associated with the first conversation based on the response, wherein the response text message corresponds to the state associated with the formulated command; and
   presenting the response text message associated with the first conversation within the woven display of the text messaging interface, wherein the text messaging interface weaves the response text message into the woven display that also includes the second conversation being conducted concurrently with the second endpoint device via a different associated communication channel.

2. The computer-implemented method of claim 1, wherein the first subset of the request text messages includes a request for a data resource, and wherein the response text message includes the data resource.

3. The computer-implemented method of claim 1, wherein the first endpoint device and the second endpoint device are associated with different service types available within a physical environment and selectable from a list of service options presented by the same text messaging interface.

4. The computer-implemented method of claim 1, wherein the first subset of the request text messages includes one or more natural language requests, and further comprising:
 interpreting the natural language requests by parsing the natural language requests for one or more keywords, and wherein one or more of semantic analyses of the one or more keywords, user input, and message-associated statistics are used to identify a pre-defined intent, wherein selecting the first endpoint device is further based on the pre-defined intent.

5. The computer-implemented method of claim 1, wherein the plurality of request text messages is received from a mobile device associated with a user, and wherein the first subset of the request text messages is associated with a client identifier.

6. The computer-implemented method of claim 1, further comprising:
 automatically selecting the second endpoint device for the second conversation corresponding to the second subset of the request text messages.

7. The computer-implemented method of claim 1, wherein the first endpoint device is associated with a different format than the plurality of text messages, and further comprising:
 translating one or more of the request text messages into the different format associated with the first endpoint device, wherein the response is also in the different format, wherein generating the response text message includes converting the response into a natural language response for display within the text messaging interface.

8. A system, comprising:
 one or more data processors; and
 a non-transitory computer-readable storage medium containing instructions which, when executed on the one or more data processors, cause the one or more data processors to perform operations including:
  maintaining a state for a plurality of different conversations being conducted concurrently, wherein the plurality of different conversations use a same text messaging interface;
  receiving a plurality of request text messages associated with the plurality of different conversations being conducted concurrently using the same text messaging interface, wherein the plurality of request text messages for the different conversations appear in a woven display in the text messaging interface;
  identifying a first weight for a first subset of request text messages, wherein a second weight is identified for a second subset of the request text messages;
  automatically selecting a first endpoint device from a plurality of endpoint devices for first one of the concurrent conversations corresponding to the first subset of the request text messages associated with a first service type based on the first weight identified for the first subset of request text messages, and wherein the first endpoint device is associated with a first service provider and only the first subset of the request text messages is routed to the first endpoint device;
  routing only the second subset of the request text messages to a second endpoint device from the plurality of endpoint devices for a second one of the concurrent conversations based on the second weight identified for the second subset of the request text messages, wherein the second endpoint device is associated with a second service provider associated with a second service type, and wherein the second endpoint device is distinct from the first endpoint device;
  formulating a command based on the first subset of the request text messages and the first endpoint device, wherein when the formulated command is received at the first endpoint device, the first endpoint device generates a response to the formulated command that is based on a state associated with the first conversation;
  generating a response text message associated with the first conversation based on the response, wherein the response text message corresponds to the state associated with the formulated command; and
  presenting the response text message associated with the first conversation within the woven display of the text messaging interface, wherein the text messaging interface weaves the response text message into the woven display that also includes the second conversation being conducted concurrently with the second endpoint device via a different associated communication channel.

9. The system of claim 8, wherein the first subset of the request text messages includes a request for a data resource, and wherein the response text message includes the data resource.

10. The system of claim 8, wherein and the second endpoint device are associated with different service types available within a physical environment and selectable from a list of service options presented by the same text messaging interface.

11. The system of claim 8, wherein the first subset of the request text messages includes one or more natural language requests, and wherein the operations further comprise:
 interpreting the natural language requests by parsing the natural language requests for one or more keywords, and wherein one or more of semantic analyses of the one or more keywords, user input, and message-associated statistics are used to identify a pre-defined intent, wherein selecting the first endpoint device is further based on the pre-defined intent.

12. The system of claim 8, wherein the plurality of request text messages is received from a mobile device associated with a user, and wherein the first subset of the request text messages is associated with a client identifier.

13. The system of claim 8, wherein the operations further include:
 automatically selecting the second endpoint device for the second conversation corresponding to the second subset of the request text messages.

14. The system of claim 8, wherein the first endpoint is associated with a different format than the plurality of text messages, and wherein the operations further include:
 translating one or more of the request text messages into the different format associated with the first endpoint device, wherein the response is also in the different format, wherein generating the response text message includes converting the response into a natural language response for display within the text messaging interface.

15. A computer-program product tangibly embodied in a non-transitory machine-readable storage medium, including instructions configured to cause a data processing apparatus to perform operations including:

maintaining a state for a plurality of different conversations being conducted concurrently, wherein the plurality of different conversations use a same text messaging interface;

receiving a plurality of request text messages associated with the plurality of different conversations being conducted concurrently using the same text messaging interface, wherein the plurality of request text messages for the different conversations appear in a woven display in the text messaging interface;

identifying a first weight for a first subset of request text messages, wherein a second weight is identified for a second subset of the request text messages;

automatically selecting a first endpoint device from a plurality of endpoint devices for first one of the concurrent conversations corresponding to the first subset of the request text messages associated with a first service type based on the first weight identified for the first subset of request text messages, and wherein the first endpoint device is associated with a first service provider and only the first subset of the request text messages is routed to the first endpoint device;

routing only the second subset of the request text messages to a second endpoint device from the plurality of endpoint devices for a second one of the concurrent conversations based on the second weight identified for the second subset of the request text messages, wherein the second endpoint device is associated with a second service provider associated with a second service type, and wherein the second endpoint device is distinct from the first endpoint device;

formulating a command based on the first subset of the request text messages and the endpoint device, wherein when the formulated command is received at the first endpoint device, the first endpoint device generates a response to the formulated command that is based on a state associated with the first conversation;

generating a response text message associated with the first conversation based on the response, wherein the response text message corresponds to the state associated with the formulated command; and presenting the response text message associated with the first conversation within the woven display of the text messaging interface, wherein the text messaging interface weaves the response text message into the woven display that also includes the second conversation being conducted concurrently with the second endpoint device via a different associated communication channel.

16. The computer-program product of claim 15, wherein the first subset of the request text messages includes a request for a data resource, and wherein the response text message includes the data resource.

17. The computer-program product of claim 15, wherein the first endpoint device and the second endpoint device are associated with different service types available within a physical environment and selectable from a list of service options presented by the same text messaging interface.

18. The computer-program product of claim 15, wherein the first subset of the request text messages includes one or more natural language requests, and wherein the operations further include:

interpreting the natural language requests by parsing the natural language requests for one or more keywords, and wherein one or more of semantic analyses of the one or more keywords, user input, and message-associated statistics are used to identify a pre-defined intent, wherein selecting the first endpoint device is further based on the pre-defined intent.

19. The computer-program product of claim 15, wherein the plurality of request text messages is received from a mobile device associated with a user, and wherein the first subset of the request text messages is associated with a client identifier.

20. The computer-program product of claim 15, wherein the operations further include:

automatically selecting the second endpoint device for the second conversation corresponding to the second subset of the request text messages.

21. The computer-program product of claim 15, wherein the first endpoint is associated with a different format than the plurality of text messages, and wherein the operations further include:

translating one or more of the request text messages into the different format associated with the first endpoint device, wherein the response is also in the different format, wherein generating the response text message includes converting the response into a natural language response for display within the text messaging interface.

\* \* \* \* \*